US009791669B2

United States Patent
Chen et al.

(10) Patent No.: US 9,791,669 B2
(45) Date of Patent: Oct. 17, 2017

(54) OPTICAL IMAGING LENS AND ELECTRONIC DEVICE COMPRISING THE SAME

(71) Applicants: Shih-Han Chen, Taichung (TW); Huabin Liao, Taichung (TW); Shan Huang, Taichung (TW)

(72) Inventors: Shih-Han Chen, Taichung (TW); Huabin Liao, Taichung (TW); Shan Huang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 25 days.

(21) Appl. No.: 14/695,049

(22) Filed: Apr. 24, 2015

(65) Prior Publication Data

US 2016/0216478 A1    Jul. 28, 2016

(30) Foreign Application Priority Data

Jan. 23, 2015  (CN) .......................... 2015 1 0034254

(51) Int. Cl.
| | |
|---|---|
| G02B 3/02 | (2006.01) |
| G02B 13/18 | (2006.01) |
| G02B 9/62 | (2006.01) |
| G02B 13/00 | (2006.01) |
| G02B 5/00 | (2006.01) |
| G02B 3/04 | (2006.01) |

(Continued)

(52) U.S. Cl.
CPC ......... *G02B 13/0045* (2013.01); *G02B 5/005* (2013.01); *G02B 9/62* (2013.01); *G02B 3/04* (2013.01); *G02B 9/64* (2013.01); *G02B 13/001* (2013.01); *G02B 13/002* (2013.01); *G02B 13/0015* (2013.01); *G02B 13/18* (2013.01); *G02B 27/0025* (2013.01)

(58) Field of Classification Search
CPC ...... G02B 13/0045; G02B 9/62; G02B 13/18; G02B 27/0025; G02B 13/0015; G02B 5/005; G02B 3/04; G02B 9/64; G02B 13/002; G02B 13/001
USPC ................................. 359/713, 739, 756, 757
See application file for complete search history.

(56) References Cited

U.S. PATENT DOCUMENTS

| | | | |
|---|---|---|---|
| 7,663,814 B2 | 2/2010 | Kitahara | |
| 7,684,689 B2 * | 3/2010 | Shangguan | .......... H04N 5/2254 348/340 |
| 8,040,618 B2 | 10/2011 | Kitahara | |

(Continued)

FOREIGN PATENT DOCUMENTS

CN        202794680 U        3/2013

Primary Examiner — Evelyn A Lester
(74) Attorney, Agent, or Firm — Winston Hsu

(57) ABSTRACT

An optical imaging lens set includes an aperture stop, a first lens element to a sixth lens element from an object side toward an image side along an optical axis. The first lens element has an image-side surface with a convex portion in a vicinity of its periphery. The second lens element has an image-side surface with a concave portion in a vicinity of the optical axis and a convex portion in a vicinity of its periphery. The third lens element is made of plastic. The fourth lens element has an image-side surface with a concave portion in a vicinity of its periphery. The fifth lens element is made of plastic. The sixth lens element is made of plastic and has an object-side surface with a concave portion in a vicinity of the optical axis.

16 Claims, 33 Drawing Sheets

(51) Int. Cl.
    *G02B 9/64* (2006.01)
    *G02B 27/00* (2006.01)

(56) References Cited

U.S. PATENT DOCUMENTS

| | | |
|---|---|---|
| 2012/0069140 A1 | 3/2012 | Tsai |
| 2012/0194726 A1 | 8/2012 | Huang |
| 2012/0262806 A1 | 10/2012 | Huang |
| 2013/0003193 A1 | 1/2013 | Huang |
| 2013/0033762 A1 | 2/2013 | Tsai |
| 2013/0070346 A1 | 3/2013 | Hsu |
| 2013/0235473 A1 | 9/2013 | Chen |
| 2013/0279021 A1* | 10/2013 | Chen .................. G02B 9/62 359/713 |
| 2013/0314804 A1 | 11/2013 | Kubota |
| 2013/0335833 A1 | 12/2013 | Liao |
| 2014/0009844 A1 | 1/2014 | Tsai |
| 2014/0049843 A1 | 2/2014 | Kubota |
| 2014/0118844 A1 | 5/2014 | Tsai |
| 2014/0211327 A1 | 7/2014 | Chen |
| 2014/0354872 A1* | 12/2014 | Chen et al. ......... G02B 13/0045 359/713 |
| 2015/0160435 A1* | 6/2015 | Chen .................. G02B 9/62 359/756 |

\* cited by examiner

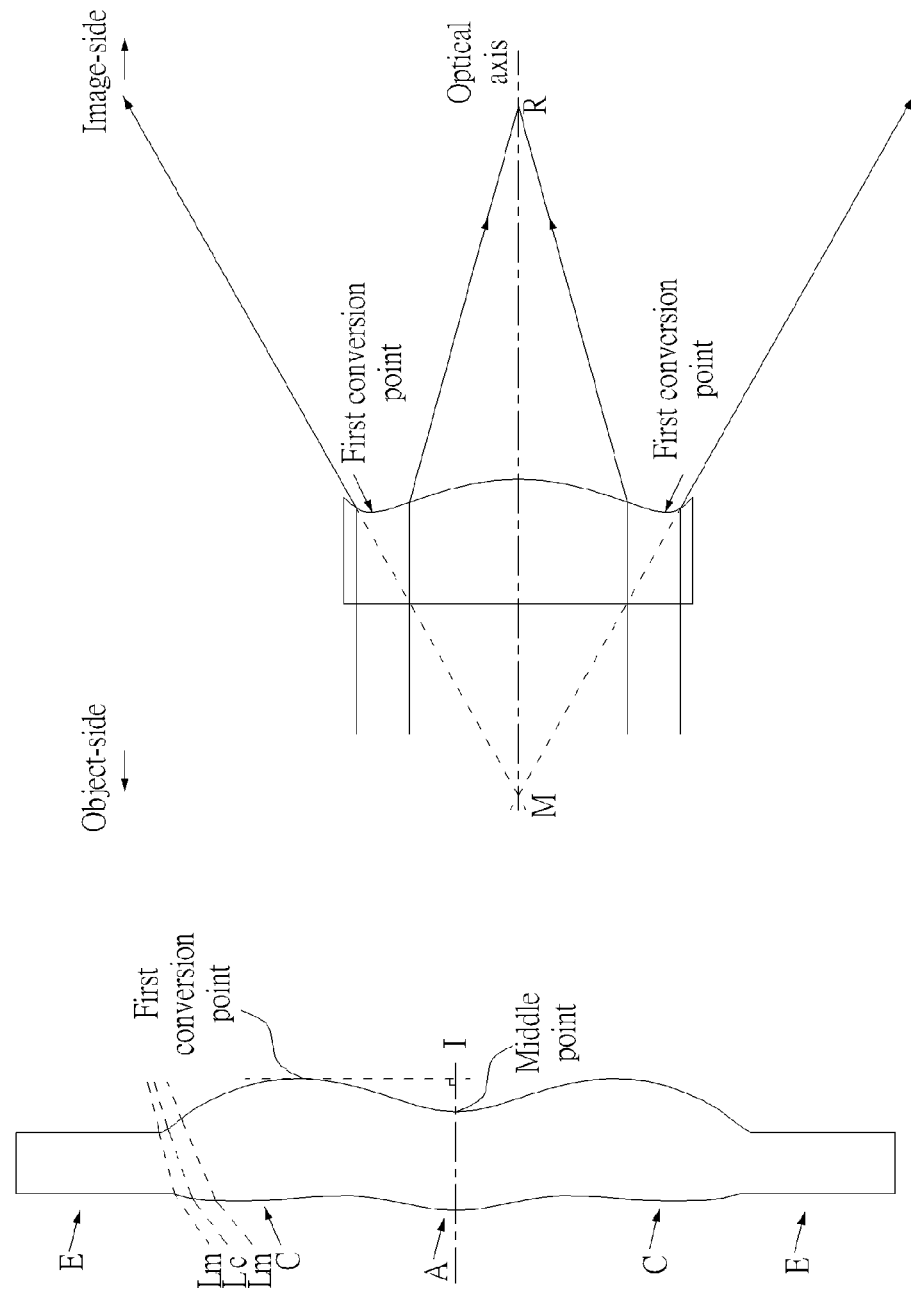

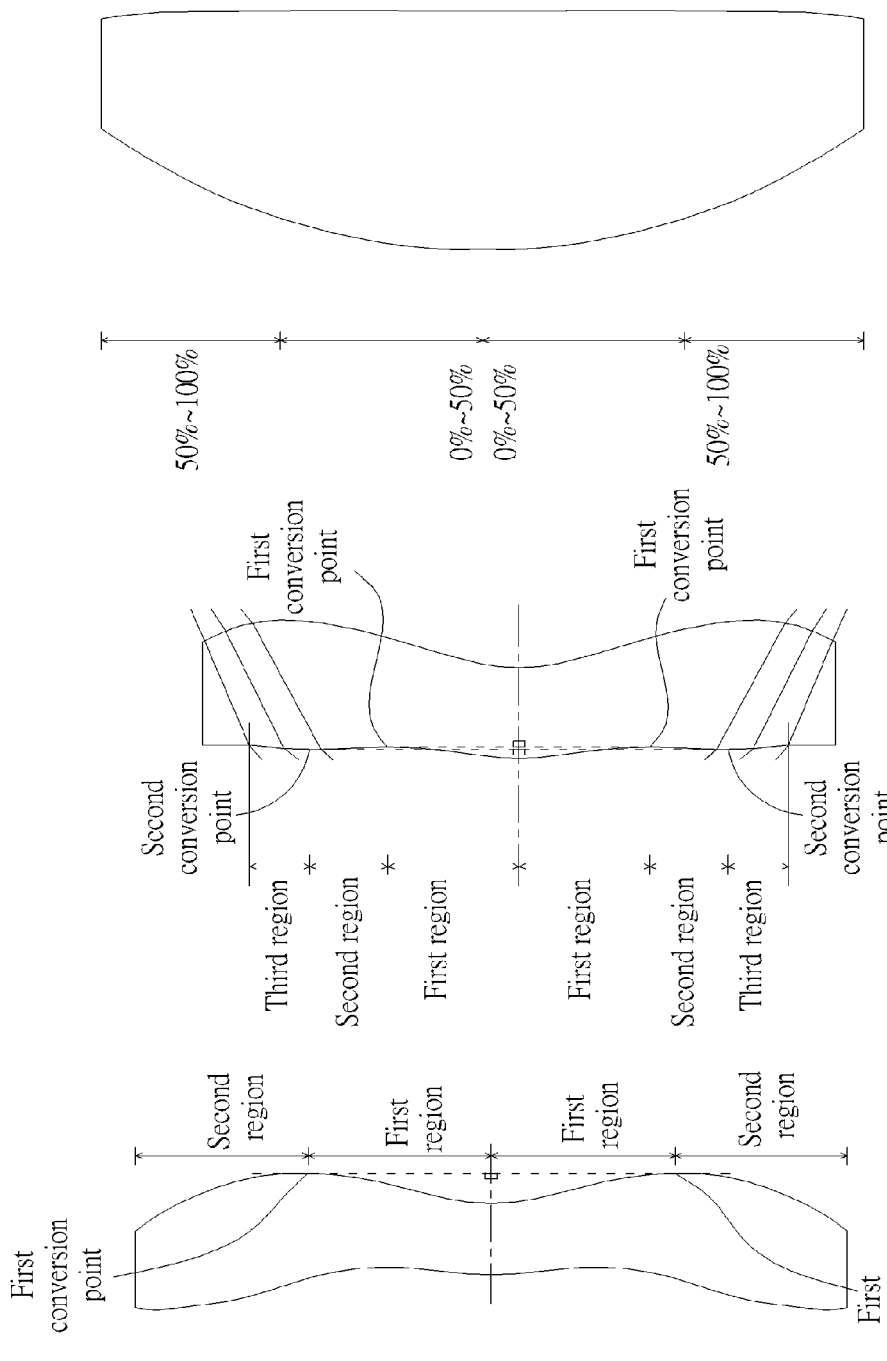

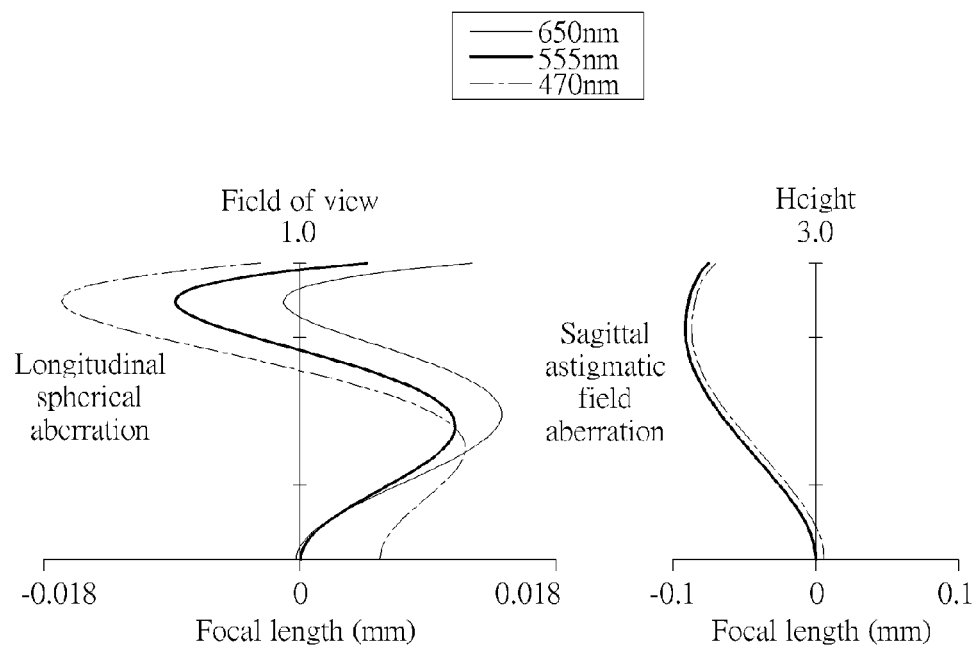
FIG. 13A
FIG. 13B
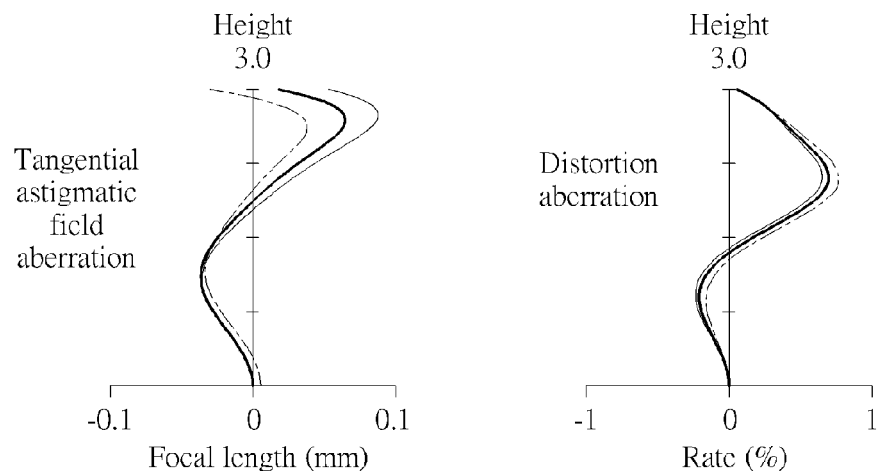
FIG. 13C
FIG. 13D

| First Example | | | | | | | |
|---|---|---|---|---|---|---|---|
| F= 2.792 mm, HFOV= 39.483 deg., Fno= 2.025 | | | | | | | |
| No. | | Curvature Radius | Ape. Stop Distance Lens Thickness Air Gap | | Refractive Index | Abbe No. | Focal Length | Material |
| | Object | Infinity | 1.00E+10 | | | | | |
| 80 | Ape. Stop | Infinity | -0.0900 | | | | | |
| 11 | First Lens | 1.7924 | 0.5307 | $T_1$ | 1.5350 | 55.7124 | 2.5115 | plastic |
| 12 | | -4.8770 | 0.0700 | $G_{12}$ | | | | |
| 21 | Second Lens | -8.9927 | 0.2300 | $T_2$ | 1.6428 | 22.4373 | -3.1521 | plastic |
| 22 | | 2.6690 | 0.0956 | $G_{23}$ | | | | |
| 31 | Third Lens | 1.9435 | 0.3179 | $T_3$ | 1.5350 | 55.7124 | 4.1527 | plastic |
| 32 | | 14.3010 | 0.2161 | $G_{34}$ | | | | |
| 41 | Fourth Lens | -1.1186 | 0.3335 | $T_4$ | 1.5350 | 55.7124 | 5.4573 | plastic |
| 42 | | -0.8938 | 0.0875 | $G_{45}$ | | | | |
| 51 | Fifth Lens | 6.4835 | 0.2300 | $T_5$ | 1.5350 | 55.7124 | 6.4162 | plastic |
| 52 | | -7.2563 | 0.0804 | $G_{56}$ | | | | |
| 61 | Sixth Lens | -10.9778 | 0.5095 | $T_6$ | 1.5311 | 55.7441 | -2.5597 | plastic |
| 62 | | 1.5826 | 0.5369 | | | | | |
| 70 | IR Filter | Infinity | 0.2100 | | 1.5168 | 64.1673 | | |
| | IR Filter-Image Plane | Infinity | 0.3176 | | | | | |
| 71 | Image Plane | Infinity | | | | | | |

FIG. 22

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -2.1214E-02 | 1.3685E-01 | 7.9402E-02 | -3.6556E-01 | -4.0815E-01 | 9.4598E-02 |
| a6 | 1.7688E-02 | -1.3828E-01 | 1.3267E-01 | 5.2220E-01 | -1.5247E-01 | -5.1534E-01 |
| a8 | -3.1306E-01 | -6.4335E-01 | -9.7324E-01 | -7.5351E-01 | 2.8204E-01 | 3.4004E-01 |
| a10 | 5.6372E-01 | 8.4119E-01 | 6.5539E-01 | 1.7366E-01 | 0.0000E+00 | 0.0000E+00 |
| a12 | -4.9869E-01 | -3.4909E-01 | 1.2875E-01 | 2.1479E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.3543E-01 | 0.0000E+00 | 0.0000E+00 | 0.0000E+00 | -8.7990E+00 |
| a4 | 4.9593E-01 | 2.9270E-01 | -1.0830E-01 | -3.2384E-04 | -6.1219E-02 | -1.1187E-01 |
| a6 | -1.8030E-01 | -9.9411E-02 | -2.0912E-02 | 1.9974E-02 | 5.0301E-03 | 6.5843E-02 |
| a8 | 2.0377E-01 | 1.7668E-01 | 2.1570E-02 | -3.7302E-02 | 2.1534E-02 | -3.6792E-02 |
| a10 | -1.9428E-01 | 7.8682E-02 | -5.5671E-02 | 1.9623E-02 | -5.8425E-03 | 1.0911E-02 |
| a12 | 1.0126E-01 | -9.6194E-02 | 2.2859E-02 | -3.0447E-03 | -9.0565E-04 | -1.6188E-03 |
| a14 | 0.0000E+00 | 0.0000E+00 | 0.0000E+00 | 0.0000E+00 | 4.5269E-04 | 4.0713E-05 |
| a16 | 0.0000E+00 | 0.0000E+00 | 0.0000E+00 | 0.0000E+00 | -3.6334E-05 | 1.1477E-05 |

FIG. 23

| Second Example |||||||
|---|---|---|---|---|---|---|
| F= 2.704 mm, HFOV= 40.405 deg., Fno= 2.019 |||||||
| No. | | Curvature Radius | Ape. Stop Distance Lens Thickness Air Gap | Refractive Index | Abbe No. | Focal Length | Material |
| | Object | Infinity | 1.00E+10 | | | | |
| 80 | Ape. Stop | Infinity | -0.0900 | | | | |
| 11 | First Lens | 1.8128 | 0.4989 T₁ | 1.5350 | 55.7124 | 2.5399 | plastic |
| 12 | | -4.9714 | 0.0700 G₁₂ | | | | |
| 21 | Second Lens | -9.2144 | 0.2300 T₂ | 1.6428 | 22.4373 | -3.1276 | plastic |
| 22 | | 2.6232 | 0.0823 G₂₃ | | | | |
| 31 | Third Lens | 1.9940 | 0.3352 T₃ | 1.5350 | 55.7124 | 4.1658 | plastic |
| 32 | | 17.3341 | 0.1788 G₃₄ | | | | |
| 41 | Fourth Lens | -1.1323 | 0.4119 T₄ | 1.5350 | 55.7124 | 4.5525 | plastic |
| 42 | | -0.8721 | 0.0388 G₄₅ | | | | |
| 51 | Fifth Lens | 5.4183 | 0.5085 T₅ | 1.5350 | 55.7124 | 5.5229 | plastic |
| 52 | | -6.3322 | 0.0494 G₅₆ | | | | |
| 61 | Sixth Lens | -11.4539 | 0.2612 T₆ | 1.5311 | 55.7441 | -2.4935 | plastic |
| 62 | | 1.5150 | 0.5538 | | | | |
| 70 | IR Filter | Infinity | 0.2100 | 1.5168 | 64.1673 | | |
| | IR Filter-Image Plane | Infinity | 0.3760 | | | | |
| 71 | Image Plane | Infinity | | | | | |

FIG. 24

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -2.3053E-02 | 1.4150E-01 | 8.4230E-02 | -3.5867E-01 | -4.0447E-01 | 1.0603E-01 |
| a6 | 1.5091E-02 | -1.4319E-01 | 1.4728E-01 | 5.5263E-01 | -1.5105E-01 | -5.0148E-01 |
| a8 | -3.0276E-01 | -6.4590E-01 | -1.0044E+00 | -7.3842E-01 | 3.1590E-01 | 3.3294E-01 |
| a10 | 5.5790E-01 | 8.6697E-01 | 6.2163E-01 | 8.0108E-02 | 0.0000E+00 | 0.0000E+00 |
| a12 | -4.9608E-01 | -3.6870E-01 | 1.5217E-01 | 2.7401E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.5474E-01 | 0.0000E+00 | 0.0000E+00 | 0.0000E+00 | -8.8009E+00 |
| a4 | 5.0362E-01 | 2.9657E-01 | -1.2080E-01 | -3.3326E-02 | -6.5549E-02 | -1.1046E-01 |
| a6 | -1.4896E-01 | -1.1276E-01 | -2.6222E-02 | 2.7109E-02 | 3.0078E-03 | 6.5774E-02 |
| a8 | 2.2456E-01 | 1.6296E-01 | 3.7271E-02 | -3.3859E-02 | 2.1772E-02 | -3.6449E-02 |
| a10 | -2.4059E-01 | 9.5340E-02 | -7.5234E-02 | 1.8375E-02 | -6.3948E-03 | 1.1148E-02 |
| a12 | 1.1623E-01 | -9.2077E-02 | 2.9007E-02 | -3.5243E-03 | -7.4618E-04 | -1.6486E-03 |
| a14 | 0.0000E+00 | 0.0000E+00 | 0.0000E+00 | 0.0000E+00 | 4.7869E-04 | 3.7625E-05 |
| a16 | 0.0000E+00 | 0.0000E+00 | 0.0000E+00 | 0.0000E+00 | -4.2806E-05 | 1.2595E-05 |

FIG. 25

| Third Example |||||||
| :---: | :---: | :---: | :---: | :---: | :---: | :---: | :---: |
| F= 2.750 mm, HFOV= 39.968 deg., Fno= 2.021 |||||||
| No. | | Curvature Radius | Ape. Stop Distance Lens Thickness Air Gap | | Refractive Index | Abbe No. | Focal Length | Material |
| | Object | Infinity | 1.00E+10 | | | | | |
| 80 | Ape. Stop | Infinity | -0.0900 | | | | | |
| 11 | First Lens | 1.7741 | 0.3669 | $T_1$ | 1.5350 | 55.7124 | 2.5424 | plastic |
| 12 | | -5.4872 | 0.0700 | $G_{12}$ | | | | |
| 21 | Second Lens | -8.8227 | 0.2300 | $T_2$ | 1.6428 | 22.4373 | -3.2195 | plastic |
| 22 | | 2.7599 | 0.0936 | $G_{23}$ | | | | |
| 31 | Third Lens | 2.0291 | 0.2663 | $T_3$ | 1.5350 | 55.7124 | 4.1181 | plastic |
| 32 | | 23.5853 | 0.1611 | $G_{34}$ | | | | |
| 41 | Fourth Lens | -1.1396 | 0.5141 | $T_4$ | 1.5350 | 55.7124 | 4.1536 | plastic |
| 42 | | -0.8730 | 0.0662 | $G_{45}$ | | | | |
| 51 | Fifth Lens | 5.1277 | 0.2300 | $T_5$ | 1.5350 | 55.7124 | 5.7034 | plastic |
| 52 | | -7.4793 | 0.1640 | $G_{56}$ | | | | |
| 61 | Sixth Lens | -9.9348 | 0.2300 | $T_6$ | 1.5311 | 55.7441 | -2.3876 | plastic |
| 62 | | 1.4708 | 0.8170 | | | | | |
| 70 | IR Filter | Infinity | 0.2100 | | 1.5168 | 64.1673 | | |
| | IR Filter-Image Plane | Infinity | 0.2981 | | | | | |
| 71 | Image Plane | Infinity | | | | | | |

FIG. 26

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -2.9900E-02 | 1.4908E-01 | 8.1007E-02 | -3.5645E-01 | -4.0501E-01 | 1.0583E-01 |
| a6 | 9.1262E-03 | -1.3350E-01 | 1.4061E-01 | 5.6312E-01 | -1.4978E-01 | -5.0895E-01 |
| a8 | -3.1011E-01 | -6.7029E-01 | -9.9191E-01 | -7.0727E-01 | 3.0052E-01 | 3.2981E-01 |
| a10 | 5.1833E-01 | 7.8141E-01 | 6.4146E-01 | 4.8516E-02 | 0.0000E+00 | 0.0000E+00 |
| a12 | -6.2735E-01 | -3.5819E-01 | 2.0480E-01 | 2.3493E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.5114E-01 | 0.0000E+00 | 0.0000E+00 | 0.0000E+00 | -8.9924E+00 |
| a4 | 5.0286E-01 | 2.9701E-01 | -1.1964E-01 | -3.5331E-02 | -6.4173E-02 | -1.1938E-01 |
| a6 | -1.4307E-01 | -1.1759E-01 | -2.0816E-02 | 2.6609E-02 | 3.4212E-03 | 6.5056E-02 |
| a8 | 2.2561E-01 | 1.5740E-01 | 4.0091E-02 | -3.3762E-02 | 2.1916E-02 | -3.6486E-02 |
| a10 | -2.5481E-01 | 9.3397E-02 | -7.3690E-02 | 1.8672E-02 | -6.3813E-03 | 1.1154E-02 |
| a12 | 8.4119E-02 | -9.0343E-02 | 3.1293E-02 | -3.2827E-03 | -7.5165E-04 | -1.6462E-03 |
| a14 | 0.0000E+00 | 0.0000E+00 | 0.0000E+00 | 0.0000E+00 | 4.7743E-04 | 3.8583E-05 |
| a16 | 0.0000E+00 | 0.0000E+00 | 0.0000E+00 | 0.0000E+00 | -4.1138E-05 | 1.3288E-05 |

FIG. 27

| Fourth Example |||||||
|---|---|---|---|---|---|---|
| $F= 2.725$ mm, HFOV= 40.150 deg., Fno= 2.019 |||||||

| No. | | Curvature Radius | Ape. Stop Distance Lens Thickness Air Gap | | Refractive Index | Abbe No. | Focal Length | Material |
|---|---|---|---|---|---|---|---|---|
|  | Object | Infinity | 1.00E+10 | | | | | |
| 80 | Ape. Stop | Infinity | -0.0900 | | | | | |
| 11 | First Lens | 1.9900 | 0.4247 | $T_1$ | 1.5350 | 55.7124 | 2.6396 | plastic |
| 12 | | -4.5533 | 0.0700 | $G_{12}$ | | | | |
| 21 | Second Lens | -12.2297 | 0.4901 | $T_2$ | 1.6428 | 22.4373 | -2.9325 | plastic |
| 22 | | 2.2850 | 0.0768 | $G_{23}$ | | | | |
| 31 | Third Lens | 1.7351 | 0.3009 | $T_3$ | 1.5350 | 55.7124 | 3.5797 | plastic |
| 32 | | 16.7945 | 0.1718 | $G_{34}$ | | | | |
| 41 | Fourth Lens | -1.1447 | 0.3891 | $T_4$ | 1.5350 | 55.7124 | 4.2302 | plastic |
| 42 | | -0.8514 | 0.0772 | $G_{45}$ | | | | |
| 51 | Fifth Lens | 5.1190 | 0.4292 | $T_5$ | 1.5350 | 55.7124 | 6.1516 | plastic |
| 52 | | -9.0315 | 0.1277 | $G_{56}$ | | | | |
| 61 | Sixth Lens | -6.4919 | 0.2300 | $T_6$ | 1.5311 | 55.7441 | -2.2484 | plastic |
| 62 | | 1.4873 | 0.5319 | | | | | |
| 70 | IR Filter | Infinity | 0.2100 | | 1.5168 | 64.1673 | | |
|  | IR Filter-Image Plane | Infinity | 0.2856 | | | | | |
| 71 | Image Plane | Infinity | | | | | | |

FIG. 28

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -2.4364E-02 | 1.4768E-01 | 7.7363E-02 | -3.4467E-01 | -4.0461E-01 | 9.8598E-02 |
| a6 | 1.8832E-02 | -1.4753E-01 | 1.5764E-01 | 5.6566E-01 | -1.5939E-01 | -5.0068E-01 |
| a8 | -3.0366E-01 | -6.7393E-01 | -9.8576E-01 | -7.0585E-01 | 2.8774E-01 | 3.4040E-01 |
| a10 | 5.1753E-01 | 8.1361E-01 | 6.3537E-01 | 4.7103E-02 | 0.0000E+00 | 0.0000E+00 |
| a12 | -5.8302E-01 | -3.1709E-01 | 1.9267E-01 | 2.2889E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.2986E-01 | 0.0000E+00 | 0.0000E+00 | 0.0000E+00 | -9.3688E+00 |
| a4 | 5.0651E-01 | 2.8985E-01 | -1.2289E-01 | -3.4015E-02 | -6.7146E-02 | -1.0894E-01 |
| a6 | -1.5182E-01 | -1.1816E-01 | -2.3493E-02 | 2.6520E-02 | 3.2965E-03 | 6.6481E-02 |
| a8 | 2.1801E-01 | 1.6093E-01 | 3.9834E-02 | -3.4329E-02 | 2.2003E-02 | -3.6327E-02 |
| a10 | -2.5063E-01 | 9.4643E-02 | -7.3560E-02 | 1.8243E-02 | -6.3181E-03 | 1.1170E-02 |
| a12 | 1.0338E-01 | -8.9690E-02 | 3.2305E-02 | -3.5309E-03 | -7.3000E-04 | -1.6510E-03 |
| a14 | 0.0000E+00 | 0.0000E+00 | 0.0000E+00 | 0.0000E+00 | 4.7934E-04 | 3.5714E-05 |
| a16 | 0.0000E+00 | 0.0000E+00 | 0.0000E+00 | 0.0000E+00 | -4.7917E-05 | 1.2144E-05 |

FIG. 29

| Fifth Example |||||||
|---|---|---|---|---|---|---|
| F= 2.790 mm, HFOV= 39.529 deg., Fno= 2.013 |||||||
| No. | Curvature Radius | Ape. Stop Distance Lens Thickness Air Gap || Refractive Index | Abbe No. | Focal Length | Material |
| Object | Infinity | 1.00E+10 | | | | | |
| 80 | Ape. Stop | Infinity | -0.0900 | | | | |
| 11 | First Lens | 1.7613 | 0.7126 | $T_1$ | 1.5350 | 55.7124 | 2.5355 | plastic |
| 12 | | -5.1425 | 0.0700 | $G_{12}$ | | | |
| 21 | Second Lens | -7.7446 | 0.2300 | $T_2$ | 1.6428 | 22.4373 | -2.7963 | plastic |
| 22 | | 2.3927 | 0.0847 | $G_{23}$ | | | |
| 31 | Third Lens | 1.8451 | 0.2577 | $T_3$ | 1.5350 | 55.7124 | 3.8411 | plastic |
| 32 | | 16.6916 | 0.1823 | $G_{34}$ | | | |
| 41 | Fourth Lens | -1.1373 | 0.3674 | $T_4$ | 1.5350 | 55.7124 | 4.3623 | plastic |
| 42 | | -0.8519 | 0.0720 | $G_{45}$ | | | |
| 51 | Fifth Lens | 4.6310 | 0.3611 | $T_5$ | 1.5350 | 55.7124 | 5.5633 | plastic |
| 52 | | -8.1802 | 0.0917 | $G_{56}$ | | | |
| 61 | Sixth Lens | -11.2245 | 0.2300 | $T_6$ | 1.5311 | 55.7441 | -2.3717 | plastic |
| 62 | | 1.4343 | 0.5388 | | | | |
| 70 | IR Filter | Infinity | 0.2100 | | 1.5168 | 64.1673 | |
| | IR Filter-Image Plane | Infinity | 0.4163 | | | | |
| 71 | Image Plane | Infinity | | | | | |

FIG. 30

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -1.7000E-02 | 1.3791E-01 | 7.1732E-02 | -3.3619E-01 | -4.1068E-01 | 8.4450E-02 |
| a6 | 4.8171E-02 | -1.3774E-01 | 1.0081E-01 | 5.4154E-01 | -1.6181E-01 | -5.1403E-01 |
| a8 | -3.4549E-01 | -6.3003E-01 | -9.9658E-01 | -7.5428E-01 | 2.6377E-01 | 3.5110E-01 |
| a10 | 6.0607E-01 | 7.5957E-01 | 6.4525E-01 | 3.3965E-02 | 0.0000E+00 | 0.0000E+00 |
| a12 | -4.2906E-01 | -1.7355E-01 | 1.4957E-01 | 2.4975E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.5829E-01 | 0.0000E+00 | 0.0000E+00 | 0.0000E+00 | -8.5161E+00 |
| a4 | 5.0491E-01 | 2.9906E-01 | -1.3206E-01 | -3.0104E-02 | -6.2399E-02 | -1.1711E-01 |
| a6 | -1.4169E-01 | -1.2149E-01 | -2.4985E-02 | 2.7339E-02 | 3.8543E-03 | 6.4848E-02 |
| a8 | 2.1204E-01 | 1.5654E-01 | 4.0554E-02 | -3.3507E-02 | 2.1992E-02 | -3.6479E-02 |
| a10 | -2.6861E-01 | 9.4254E-02 | -7.0699E-02 | 1.8369E-02 | -6.6485E-03 | 1.1357E-02 |
| a12 | 1.0253E-01 | -8.9600E-02 | 3.1395E-02 | -3.9196E-03 | -8.1882E-04 | -1.6564E-03 |
| a14 | 0.0000E+00 | 0.0000E+00 | 0.0000E+00 | 0.0000E+00 | 4.8486E-04 | 1.9409E-05 |
| a16 | 0.0000E+00 | 0.0000E+00 | 0.0000E+00 | 0.0000E+00 | -3.6508E-05 | 1.6752E-05 |

FIG. 31

| Sixth Example ||||||||
|---|---|---|---|---|---|---|---|
| F= 2.722 mm, HFOV= 40.216 deg., Fno= 2.027 ||||||||
| No. | | Curvature Radius | Ape. Stop Distance Lens Thickness Air Gap | | Refractive Index | Abbe No. | Focal Length | Material |
| | Object | Infinity | 1.00E+10 | | | | | |
| 80 | Ape. Stop | Infinity | -0.0900 | | | | | |
| 11 | First Lens | 1.9648 | 0.3645 | $T_1$ | 1.5350 | 55.7124 | 2.6580 | plastic |
| 12 | | -4.8733 | 0.0700 | $G_{12}$ | | | | |
| 21 | Second Lens | -11.7714 | 0.5039 | $T_2$ | 1.6428 | 22.4373 | -2.9209 | plastic |
| 22 | | 2.2930 | 0.0769 | $G_{23}$ | | | | |
| 31 | Third Lens | 1.7664 | 0.3051 | $T_3$ | 1.5350 | 55.7124 | 3.5931 | plastic |
| 32 | | 19.7232 | 0.1677 | $G_{34}$ | | | | |
| 41 | Fourth Lens | -1.1485 | 0.4028 | $T_4$ | 1.5350 | 55.7124 | 4.1575 | plastic |
| 42 | | -0.8512 | 0.0728 | $G_{45}$ | | | | |
| 51 | Fifth Lens | 5.1949 | 0.4997 | $T_5$ | 1.5350 | 55.7124 | 6.2522 | plastic |
| 52 | | -9.1634 | 0.1212 | $G_{56}$ | | | | |
| 61 | Sixth Lens | -6.3011 | 0.2413 | $T_6$ | 1.5311 | 55.7441 | -2.2250 | plastic |
| 62 | | 1.4799 | 0.5258 | | | | | |
| 70 | IR Filter | Infinity | 0.2100 | | 1.5168 | 64.1673 | | |
| | IR Filter-Image Plane | Infinity | 0.2737 | | | | | |
| 71 | Image Plane | Infinity | | | | | | |

FIG. 32

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -2.4534E-02 | 1.4824E-01 | 7.7502E-02 | -3.4577E-01 | -4.0335E-01 | 9.7898E-02 |
| a6 | 1.6973E-02 | -1.4670E-01 | 1.5837E-01 | 5.6427E-01 | -1.5820E-01 | -5.0215E-01 |
| a8 | -3.1153E-01 | -6.7412E-01 | -9.7815E-01 | -7.0469E-01 | 2.8720E-01 | 3.4008E-01 |
| a10 | 4.9651E-01 | 8.0773E-01 | 6.5223E-01 | 4.8719E-02 | 0.0000E+00 | 0.0000E+00 |
| a12 | -6.2810E-01 | -3.3733E-01 | 2.2247E-01 | 2.3047E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -8.2807E-01 | 0.0000E+00 | 0.0000E+00 | 0.0000E+00 | -9.1535E+00 |
| a4 | 5.0918E-01 | 2.8930E-01 | -1.2386E-01 | -3.3720E-02 | -6.7627E-02 | -1.0814E-01 |
| a6 | -1.5071E-01 | -1.1826E-01 | -2.3085E-02 | 2.7045E-02 | 3.1110E-03 | 6.6444E-02 |
| a8 | 2.1797E-01 | 1.6093E-01 | 3.9658E-02 | -3.4109E-02 | 2.1967E-02 | -3.6303E-02 |
| a10 | -2.5112E-01 | 9.4606E-02 | -7.3728E-02 | 1.8269E-02 | -6.3265E-03 | 1.1174E-02 |
| a12 | 1.0241E-01 | -8.9428E-02 | 3.2214E-02 | -3.5255E-03 | -7.3099E-04 | -1.6511E-03 |
| a14 | 0.0000E+00 | 0.0000E+00 | 0.0000E+00 | 0.0000E+00 | 4.7865E-04 | 3.5593E-05 |
| a16 | 0.0000E+00 | 0.0000E+00 | 0.0000E+00 | 0.0000E+00 | -4.7852E-05 | 1.2145E-05 |

FIG. 33

| Seventh Example | | | | | | | |
|---|---|---|---|---|---|---|---|
| F= 2.755 mm, HFOV= 39.896 deg., Fno= 2.022 | | | | | | | |
| No. | | Curvature Radius | Ape. Stop Distance Lens Thickness Air Gap | | Refractive Index | Abbe No. | Focal Length | Material |
| | Object | Infinity | 1.00E+10 | | | | | |
| 80 | Ape. Stop | Infinity | -0.1100 | | | | | |
| 11 | First Lens | 1.8410 | 0.4699 | $T_1$ | 1.5350 | 55.7124 | 2.5407 | plastic |
| 12 | | -4.7935 | 0.0700 | $G_{12}$ | | | | |
| 21 | Second Lens | 15.3603 | 0.2300 | $T_2$ | 1.6428 | 22.4373 | -3.7336 | plastic |
| 22 | | 2.0776 | 0.1389 | $G_{23}$ | | | | |
| 31 | Third Lens | -15.5124 | 0.2820 | $T_3$ | 1.5350 | 55.7124 | 4.8755 | plastic |
| 32 | | -2.2536 | 0.1096 | $G_{34}$ | | | | |
| 41 | Fourth Lens | -1.7224 | 0.3575 | $T_4$ | 1.5350 | 55.7124 | -11.1553 | plastic |
| 42 | | -2.5932 | 0.0854 | $G_{45}$ | | | | |
| 51 | Fifth Lens | 1.9209 | 0.4582 | $T_5$ | 1.5350 | 55.7124 | 2.3225 | plastic |
| 52 | | -3.2564 | 0.0707 | $G_{56}$ | | | | |
| 61 | Sixth Lens | -12.0922 | 0.2500 | $T_6$ | 1.5311 | 55.7441 | -2.6036 | plastic |
| 62 | | 1.5785 | 0.7044 | | | | | |
| 70 | IR Filter | Infinity | 0.2100 | | 1.5168 | 64.1673 | | |
| | IR Filter-Image Plane | Infinity | 0.3653 | | | | | |
| 71 | Image Plane | Infinity | | | | | | |

FIG. 34

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | 3.8281E-03 | 1.6503E-01 | 5.1716E-03 | -2.3196E-01 | -2.8592E-01 | 1.5499E-02 |
| a6 | 4.8514E-02 | -2.6587E-01 | -4.8674E-01 | -1.4927E-01 | 4.4676E-01 | 3.6622E-01 |
| a8 | -3.4683E-01 | -4.4492E-01 | 3.7459E-02 | -1.8069E-01 | -1.2956E-01 | -1.7554E-01 |
| a10 | 5.2567E-01 | 1.1410E+00 | 6.6959E-01 | 4.5388E-01 | 0.0000E+00 | 0.0000E+00 |
| a12 | -4.0233E-01 | -6.7954E-01 | -2.7594E-01 | -1.3728E-01 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | 1.5813E+00 | 0.0000E+00 | 0.0000E+00 | 0.0000E+00 | -5.8488E+00 |
| a4 | 5.9908E-01 | 1.5686E-01 | -3.1665E-01 | 1.5837E-01 | 3.9874E-02 | -8.1184E-02 |
| a6 | -2.7537E-01 | -1.7367E-01 | 1.1089E-01 | -1.3111E-01 | -1.4195E-02 | 3.1860E-02 |
| a8 | -4.1006E-01 | 2.7679E-01 | -7.2997E-02 | 3.5152E-02 | -6.7643E-04 | -1.4072E-02 |
| a10 | 6.0694E-01 | -2.5139E-01 | -3.5622E-02 | -2.9165E-03 | -4.3124E-04 | 4.0331E-03 |
| a12 | -2.8848E-01 | 9.7259E-02 | 3.9209E-02 | 8.5991E-04 | 5.7321E-04 | -6.5293E-04 |
| a14 | 0.0000E+00 | 0.0000E+00 | 0.0000E+00 | 0.0000E+00 | -8.4727E-06 | 1.5444E-05 |
| a16 | 0.0000E+00 | 0.0000E+00 | 0.0000E+00 | 0.0000E+00 | -1.9025E-05 | 7.5314E-06 |

FIG. 35

|  | First Example | Second Example | Third Example | Fourth Example | Fifth Example | Sixth Example | Seventh Example |
|---|---|---|---|---|---|---|---|
| $T_1$ | 0.531 | 0.499 | 0.367 | 0.425 | 0.713 | 0.365 | 0.470 |
| $G_{12}$ | 0.070 | 0.070 | 0.070 | 0.070 | 0.070 | 0.070 | 0.070 |
| $T_2$ | 0.230 | 0.230 | 0.230 | 0.490 | 0.230 | 0.504 | 0.230 |
| $G_{23}$ | 0.096 | 0.082 | 0.094 | 0.077 | 0.085 | 0.077 | 0.139 |
| $T_3$ | 0.318 | 0.335 | 0.266 | 0.301 | 0.258 | 0.305 | 0.282 |
| $G_{34}$ | 0.216 | 0.179 | 0.161 | 0.172 | 0.182 | 0.168 | 0.110 |
| $T_4$ | 0.333 | 0.412 | 0.514 | 0.389 | 0.367 | 0.403 | 0.357 |
| $G_{45}$ | 0.088 | 0.039 | 0.066 | 0.077 | 0.072 | 0.073 | 0.085 |
| $T_5$ | 0.230 | 0.509 | 0.230 | 0.429 | 0.361 | 0.500 | 0.458 |
| $G_{56}$ | 0.080 | 0.049 | 0.164 | 0.128 | 0.092 | 0.121 | 0.071 |
| $T_6$ | 0.509 | 0.261 | 0.230 | 0.230 | 0.230 | 0.241 | 0.250 |
| $G_6F$ | 0.537 | 0.554 | 0.817 | 0.532 | 0.539 | 0.526 | 0.704 |
| TF | 0.210 | 0.210 | 0.210 | 0.210 | 0.210 | 0.210 | 0.210 |
| GFI | 0.318 | 0.376 | 0.298 | 0.286 | 0.416 | 0.274 | 0.365 |
| EFL | 2.792 | 2.704 | 2.750 | 2.725 | 2.790 | 2.722 | 2.755 |
| AAG | 0.550 | 0.419 | 0.555 | 0.524 | 0.501 | 0.509 | 0.475 |
| ALT | 2.152 | 2.246 | 1.837 | 2.264 | 2.159 | 2.317 | 2.048 |
| BFL | 1.065 | 1.140 | 1.325 | 1.028 | 1.165 | 1.010 | 1.280 |
| TTL | 3.766 | 3.805 | 3.717 | 3.815 | 3.825 | 3.836 | 3.802 |
| HFOV | 39.483 | 40.405 | 39.968 | 40.150 | 39.529 | 40.216 | 39.896 |
| FNO | 2.025 | 2.019 | 2.021 | 2.019 | 2.013 | 2.027 | 2.022 |
| $EFL/T_1$ | 5.261 | 5.421 | 7.495 | 6.416 | 3.915 | 7.468 | 5.864 |
| $T_6/G_{3?}$ | 2.358 | 1.461 | 1.427 | 1.339 | 1.262 | 1.438 | 2.281 |
| $ALT/G_{34}$ | 9.957 | 12.560 | 11.402 | 13.178 | 11.845 | 13.816 | 18.682 |
| $BFL/T_2$ | 4.628 | 4.955 | 5.761 | 2.096 | 5.066 | 2.003 | 5.564 |
| $T_2/T_6$ | 0.451 | 0.880 | 1.000 | 2.131 | 1.000 | 2.089 | 0.920 |
| $T_5/T_1$ | 0.433 | 1.019 | 0.627 | 1.011 | 0.507 | 1.371 | 0.975 |
| $EFL/T_2$ | 12.141 | 11.759 | 11.956 | 5.559 | 12.130 | 5.402 | 11.980 |
| $T_1/T_3$ | 1.670 | 1.488 | 1.378 | 1.411 | 2.765 | 1.195 | 1.666 |
| $ALT/T_1$ | 4.054 | 4.502 | 5.008 | 5.331 | 3.029 | 6.357 | 4.358 |
| $EFL/G_{34}$ | 12.922 | 15.125 | 17.065 | 15.860 | 15.307 | 16.229 | 25.142 |
| $AAG/(G_{45}+G_{56})$ | 3.273 | 4.753 | 2.410 | 2.555 | 3.059 | 2.622 | 3.041 |
| $T_5/T_6$ | 0.451 | 1.947 | 1.000 | 1.866 | 1.570 | 2.071 | 1.833 |
| $EFL/T_4$ | 8.374 | 6.566 | 5.349 | 7.003 | 7.594 | 6.757 | 7.708 |
| $T_5/T_4$ | 0.690 | 1.235 | 0.447 | 1.103 | 0.983 | 1.240 | 1.282 |
| $ALT/T_4$ | 6.452 | 5.452 | 3.574 | 5.819 | 5.876 | 5.752 | 5.728 |

OPTICAL IMAGING LENS AND ELECTRONIC DEVICE COMPRISING THE SAME

CROSS REFERENCE TO RELATED APPLICATION

This application claims priority from Chinese Patent Application No. 201510034254.X, filed on Jan. 23, 2015, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to a shorter optical imaging lens set of six lens elements and a shorter electronic device which includes such optical imaging lens set of six lens elements.

2. Description of the Prior Art

In recent years, the popularity of mobile phones and digital cameras makes the sizes of various portable electronic products reduce quickly, and so does that of the photography modules. The current trend of research is to develop an optical imaging lens set of a shorter length with uncompromised good quality. With the development and shrinkage of a charge coupled device (CCD) or a complementary metal oxide semiconductor element (CMOS), the optical imaging lens set installed in the photography module shrinks as well to meet the demands. However, good and necessary optical properties, such as the system aberration improvement, as well as production cost and production feasibility should be taken into consideration, too.

Most conventional optical imaging lens sets are made of four lens elements. Due to fewer lens elements, the total length of the optical imaging lens set would be shorter. With the demanding requirements of products of higher specifications, the demands for the pixels and quality optical imaging lens sets are drastically higher and higher, products of higher specifications are needed, for example, an optical imaging lens set of six lens elements. U.S. Pat. No. 7,663,814 and U.S. Pat. No. 8,040,618 all disclose a total length of 21 mm or larger. In particular, U.S. Pat. No. 8,179,616 even has a total length of 11 mm, which is not ideal for the size reduction of the portable devices. Therefore, how to reduce the total length of a photographic device, but still maintain good optical performance, is an important objective to research.

SUMMARY OF THE INVENTION

In light of the above, the present invention proposes an optical imaging lens set that is lightweight, has a low production cost, has an enlarged half of field of view, has a high resolution and has high image quality. The optical imaging lens set of six lens elements of the present invention from an object side toward an image side in order along an optical axis has an aperture stop, a first lens element, a second lens element, a third lens element, a fourth lens element, a fifth lens element and a sixth lens element. Each lens element has an object-side surface facing toward an object side as well as an image-side surface facing toward an image side.

The first lens element has an image-side surface with a convex portion in a vicinity of its periphery. The second lens element has an image-side surface with a concave portion in a vicinity of the optical axis and a convex portion in a vicinity of its periphery. The third lens element is made of plastic. The fourth lens element has an image-side surface with a concave portion in a vicinity of its periphery. The fifth lens element is made of plastic. The sixth lens element is made of plastic and has an object-side surface with a concave portion in a vicinity of the optical axis. The optical imaging lens set exclusively has the first lens element, the second lens element, the third lens element, the fourth lens element, the fifth lens element and the sixth lens element with refractive power.

In the optical imaging lens set of sixth lens elements of the present invention, the effective focal length EFL of the optical imaging lens set and a thickness $T_1$ of the first lens element along the optical axis satisfy a relationship EFL/$T_1 \leq 7.5$.

In the optical imaging lens set of sixth lens elements of the present invention, an air gap $G_{34}$ between the third lens element and the fourth lens element along the optical axis and a thickness $T_6$ of the sixth lens element along the optical axis satisfy a relationship $T_6/G_{34} \leq 4$.

In the optical imaging lens set of sixth lens elements of the present invention, a total thickness ALT of the first lens element, the second lens element, the third lens element, the fourth lens element, the fifth lens element and the sixth lens element along the optical axis, and an air gap $G_{34}$ between the third lens element and the fourth lens element along the optical axis satisfy a relationship ALT/$G_{34} \leq 19$.

In the optical imaging lens set of sixth lens elements of the present invention, a distance BFL between the image-side surface of the sixth lens element to an image plane and a thickness $T_2$ of the second lens element along the optical axis satisfy a relationship BFL/$T_2 \leq 5.77$.

In the optical imaging lens set of sixth lens elements of the present invention, a thickness $T_2$ of the second lens element along the optical axis and a thickness $T_6$ of the sixth lens element along the optical axis satisfy a relationship $0.45 \leq T_2/T_6$.

In the optical imaging lens set of sixth lens elements of the present invention, a thickness $T_1$ of the first lens element along the optical axis, and a thickness $T_5$ of the fifth lens element along the optical axis satisfy a relationship $T_5/T_1 \leq 1.4$.

In the optical imaging lens set of sixth lens elements of the present invention, the effective focal length EFL of the optical imaging lens set and a thickness $T_2$ of the second lens element along the optical axis satisfy a relationship EFL/$T_2 \leq 16$.

In the optical imaging lens set of sixth lens elements of the present invention, a thickness $T_1$ of the first lens element along the optical axis, and a thickness $T_3$ of the third lens element along the optical axis satisfy a relationship $1 \leq T_1/T_3$.

In the optical imaging lens set of sixth lens elements of the present invention, a total thickness ALT of the first lens element, the second lens element, the third lens element, the fourth lens element, the fifth lens element and the sixth lens element along the optical axis, and a thickness $T_1$ of the first lens element along the optical axis satisfy a relationship ALT/$T_1 \leq 7$.

In the optical imaging lens set of sixth lens elements of the present invention, the effective focal length EFL of the optical imaging lens set and an air gap $G_{34}$ between the third lens element and the fourth lens element along the optical axis and an air gap $G_{34}$ between the third lens element and the fourth lens element along the optical axis satisfy a relationship EFL/$G_{34} \leq 25.2$.

In the optical imaging lens set of sixth lens elements of the present invention, the sum of all three air gaps AAG between each lens element from the first lens element to the sixth lens element along the optical axis, an air gap $G_{45}$ between the fourth lens element and the fifth lens element along the optical axis and an air gap $G_{56}$ between the fifth lens element and the sixth lens element along the optical axis satisfy a relationship $2.41 \leq AAG/(G_{45}+G_{56})$.

In the optical imaging lens set of sixth lens elements of the present invention, a thickness $T_5$ of the fifth lens element along the optical axis and a thickness $T_6$ of the sixth lens element along the optical axis satisfy a relationship $T_5/T_6 \leq 2.08$.

In the optical imaging lens set of sixth lens elements of the present invention, the effective focal length EFL of the optical imaging lens set and an a thickness $T_4$ of the fourth lens element along the optical axis satisfy a relationship $EFL/T_4 \leq 9.38$.

In the optical imaging lens set of sixth lens elements of the present invention, a thickness $T_4$ of the fourth lens element along the optical axis and a thickness $T_5$ of the fifth lens element along the optical axis satisfy a relationship $T_5/T_4 \leq 1.29$.

In the optical imaging lens set of sixth lens elements of the present invention, a total thickness ALT of the first lens element, the second lens element, the third lens element, the fourth lens element, the fifth lens element and the sixth lens element along the optical axis, and a thickness $T_4$ of the fourth lens element along the optical axis satisfy a relationship $ALT/T_4 \leq 6.5$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, and an image sensor disposed at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 13A illustrates the longitudinal spherical aberration on the image plane of the fourth example.

FIG. 13B illustrates the astigmatic aberration on the sagittal direction of the fourth example.

FIG. 13C illustrates the astigmatic aberration on the tangential direction of the fourth example.

FIG. 13D illustrates the distortion aberration of the fourth example.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows some important ratios in the examples.

DETAILED DESCRIPTION

Figure 6:
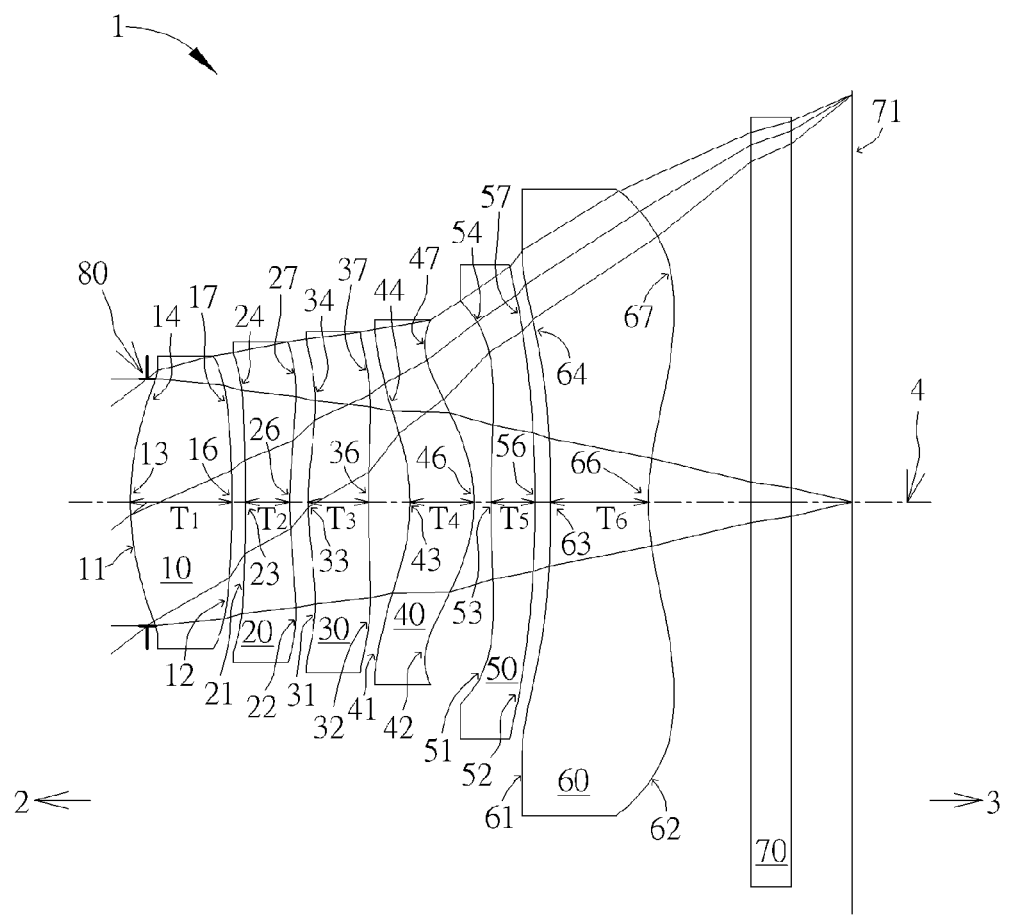
FIG. 6 illustrates a first example of the optical imaging lens set of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0-50% of the effective radius (radius of the clear aperture) is determined as the portion in a vicinity of the optical axis, and the portion between 50-100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of six lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 may be made of a transparent plastic material but the present invention is not limited to this and each has an appropriate refractive power. However, the third lens element 30, the fifth lens element 50 and the sixth lens element 60 are made of a transparent plastic material. There are exclusively six lens elements, which means the first lens element 10, the second lens element 20, the third lens element 30, the fourth lens element 40, the fifth lens element 50 and the sixth lens element 60, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 70. In one embodiments of the present invention, the optional filter 70 may be a filter of various suitable functions, for example, the filter 70 may be an infrared cut filter (IR cut filter), placed between the sixth lens element 60 and the image plane 71. The filter 70 may be made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; the sixth lens element 60 has a sixth object-side surface 61 and a sixth image-side surface 62. In addition, each object-side surface and image-side surface in the optical imaging lens set 1 of the present invention has a part (or portion) in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, the fifth lens element 50 has a fifth lens element thickness $T_5$, the sixth lens element 60 has a sixth lens element thickness $T_6$. Therefore, the total thickness of all the lens elements in the optical imaging lens set 1 along the optical axis 4 is $ALT=T_1+T_2+T_3+T_4+T_5+T_6$.

In addition, between two adjacent lens elements in the optical imaging lens set 1 of the present invention there is an air gap along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50 as well as an air gap $G_{56}$ is disposed between the fifth lens element 50 and the sixth lens element 60. Therefore, the sum of total three air gaps between adjacent lens elements from the first lens element 10 to the sixth lens element 60 along the optical axis 4 is $AAG=G_{12}+G_{23}+G_{34}+G_{45}+G_{56}$.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the sixth lens element 60 to the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is υ1; the Abbe number of the second lens element 20 is υ2; the Abbe number of the third lens element 30 is υ3; and the Abbe number of the fourth lens element 40 is υ4; the Abbe number of the fifth lens element 50 is υ5; and the Abbe number of the sixth lens element 60 is υ6.

First Example

Figures 7A, 7B:
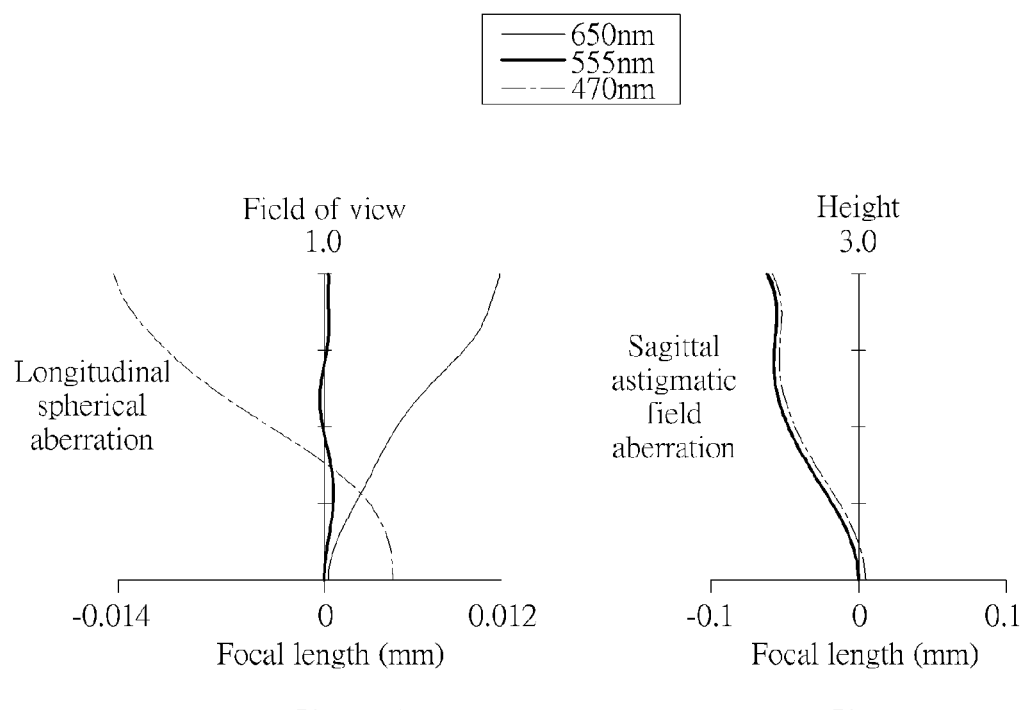
FIG. 7A illustrates the longitudinal spherical aberration on the image plane of the first example.
FIG. 7B illustrates the astigmatic aberration on the sagittal direction of the first example.
Figures 7C, 7D:
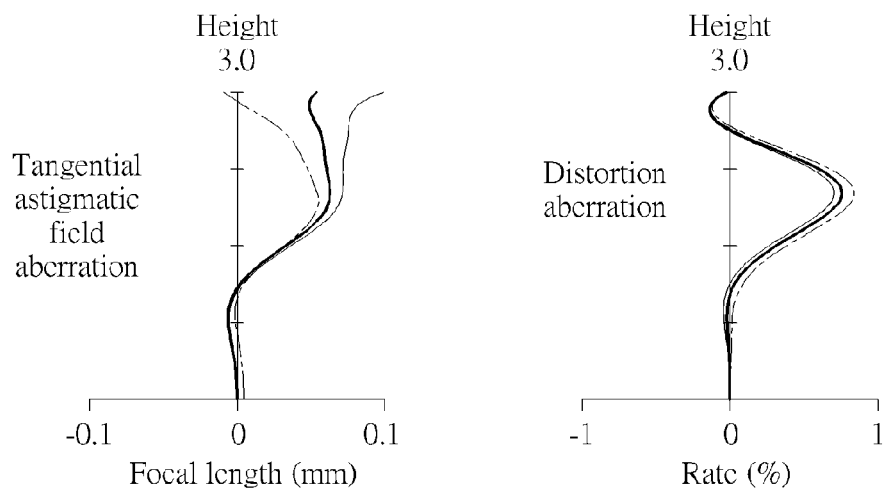
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stand for "Half Field of View (HFOV)", HFOV stands for the half field of view which is half of the field of view of the entire optical lens element system. The Y axis of the astigmatic field and the distortion in each example stands for "image height", which is 3 mm.

The optical imaging lens set 1 of the first example has six lens elements 10 to 60 made of a plastic material and having refractive power. The optical imaging lens set 1 also has an aperture stop 80, a filter 70, and an image plane 71. The aperture stop 80 is provided between the object side 2 and the first lens element 10. The filter 70 may be used for preventing specific wavelength light (such as the infrared light) reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery. The first image-side surface 12 facing toward the image side 3 is a convex surface, having a convex part 16 in the vicinity of the optical axis and a convex part 17 in a vicinity of its circular periphery. Besides, both the first object-side surface 11 and the first image-side 12 of the first lens element 10 are aspherical surfaces.

The second lens element 20 has negative refractive power. The second object-side concave surface 21 facing toward the object side 2 has a concave part 23 in the vicinity of the optical axis and a concave part 24 in a vicinity of its circular periphery. The second image-side surface 22 facing toward the image side 3 has a concave part 26 in the vicinity of the optical axis and a convex part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 has a convex part 33 in the vicinity of the optical axis and a concave part 34 in a vicinity of its circular periphery. The third image-side surface 32 facing toward the image side 3 has a concave part 36 in the vicinity of the optical axis and a convex part 37 in a vicinity of its circular periphery. Both the third object-side surface 31 and the third image-side 32 of the third lens element 30 are aspherical surfaces.

The fourth lens element 40 has positive refractive power. The fourth object-side surface 41 facing toward the object side 2 has a concave part 43 in the vicinity of the optical axis and a concave part 44 in a vicinity of its circular periphery. The fourth image-side surface 42 facing toward the image side 3 has a convex part 46 in the vicinity of the optical axis and a concave part 47 in a vicinity of its circular periphery. Both the fourth object-side surface 41 and the fourth image-side 42 of the fourth lens element 40 are aspherical surfaces.

The fifth lens element 50 has positive refractive power. The fifth object-side surface 51 facing toward the object side 2 has a convex part 53 in the vicinity of the optical axis and a concave part 54 in a vicinity of its circular periphery. The fifth image-side surface 52 facing toward the image side 3 has a convex part 56 in the vicinity of the optical axis and a convex part 57 in a vicinity of its circular periphery. Both the fifth object-side surface 51 and the fifth image-side 52 of the fifth lens element 50 are aspherical surfaces.

The sixth lens element 60 has negative refractive power. The concave sixth object-side surface 61 facing toward the object side 2 has a concave part 63 in the vicinity of the optical axis and a concave part 64 in a vicinity of its circular periphery. The sixth image-side surface 62 facing toward the image side 3 has a concave part 66 in the vicinity of the optical axis and a convex part 67 in a vicinity of its circular periphery. Both the sixth object-side surface 61 and the sixth image-side 62 of the sixth lens element 60 are aspherical surfaces. The filter 70 may be disposed between the sixth image-side 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance
Y from the optical axis and the tangent plane of the vertex on the optical axis of the aspherical surface);
Y represents a vertical distance from a point on the aspherical surface to the optical axis;
K is a conic constant;
$a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm).

The image height is 3 mm. HFOV is 39.483 degrees. Some important ratios of the first example are as follows:
EFL/$T_1$=5.261
$T_6$/$G_{34}$=2.358
ALT/$G_{34}$=9.957
BFL/$T_2$=4.628
$T_2$/$T_6$=0.451
$T_5$/$T_1$=0.433
EFL/$T_2$=12.141
$T_1$/$T_3$=1.670
ALT/$T_1$=4.054
EFL/$G_{34}$=12.922
AAG/($G_{45}$+$G_{56}$)=3.273
$T_5$/$T_6$=0.451
EFL/$T_4$=8.374
$T_5$/$T_4$=0.690
ALT/$T_4$=6.452

Second Example

Figure 8:
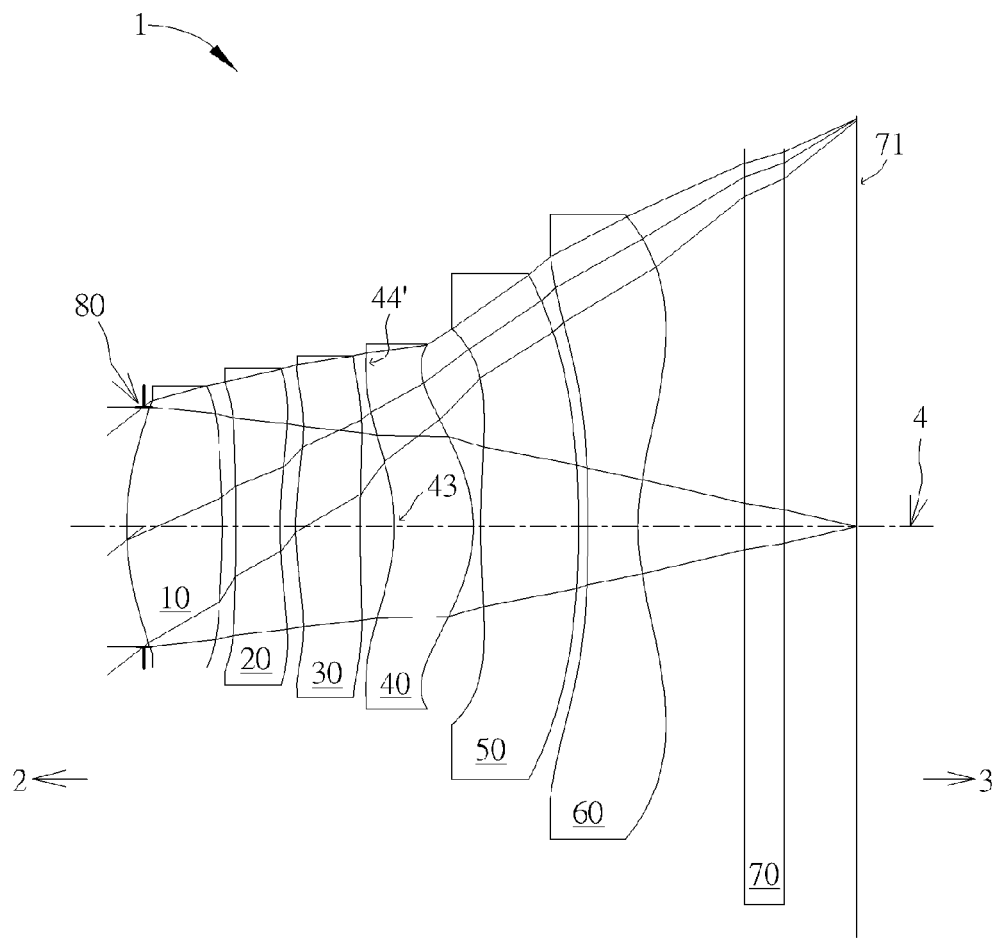
FIG. 8 illustrates a second example of the optical imaging lens set of six lens elements of the present invention.
Figures 9A, 9B:
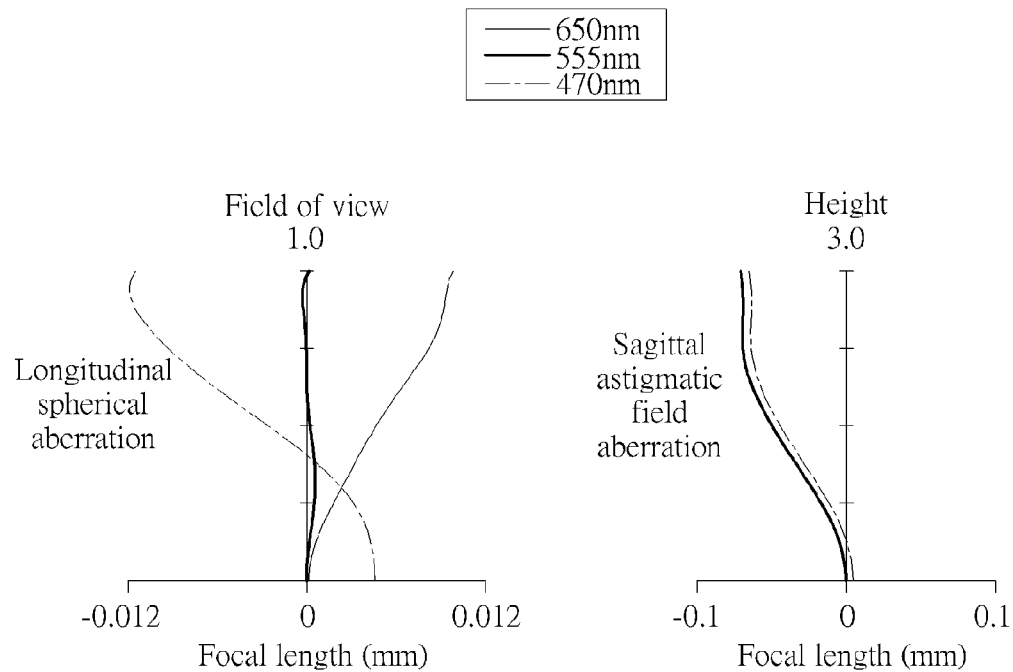
FIG. 9A illustrates the longitudinal spherical aberration on the image plane of the second example.
FIG. 9B illustrates the astigmatic aberration on the sagittal direction of the second example.
Figures 9C, 9D:
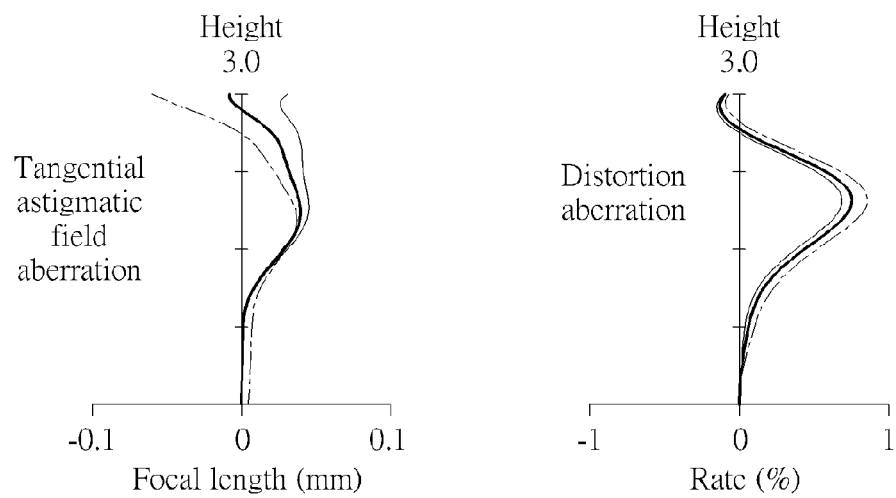
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the fourth object-side surface 41 has a concave part 43 in the vicinity of the optical axis and a convex part 44' in a vicinity of its circular periphery. The optical data of the second example of the optical imaging lens set are shown in FIG. 24 while the aspheric surface data are shown in FIG. 25. The image height is 3 mm. HFOV is 40.405 degrees.

Some important ratios of the second example are as follows:
EFL/$T_1$=5.421
$T_6$/$G_{34}$=1.461
ALT/$G_{34}$=12.560
BFL/$T_2$=4.955
$T_2$/$T_6$=0.880
$T_5$/$T_1$=1.019
EFL/$T_2$=11.759
$T_1$/$T_3$=1.488
ALT/$T_1$=4.502
EFL/$G_{34}$=15.125
AAG/($G_{45}$+$G_{56}$)=4.753
$T_5$/$T_6$=1.947
EFL/$T_4$=6.566
$T_5$/$T_4$=1.235
ALT/$T_4$=5.452

Third Example

Figure 10:
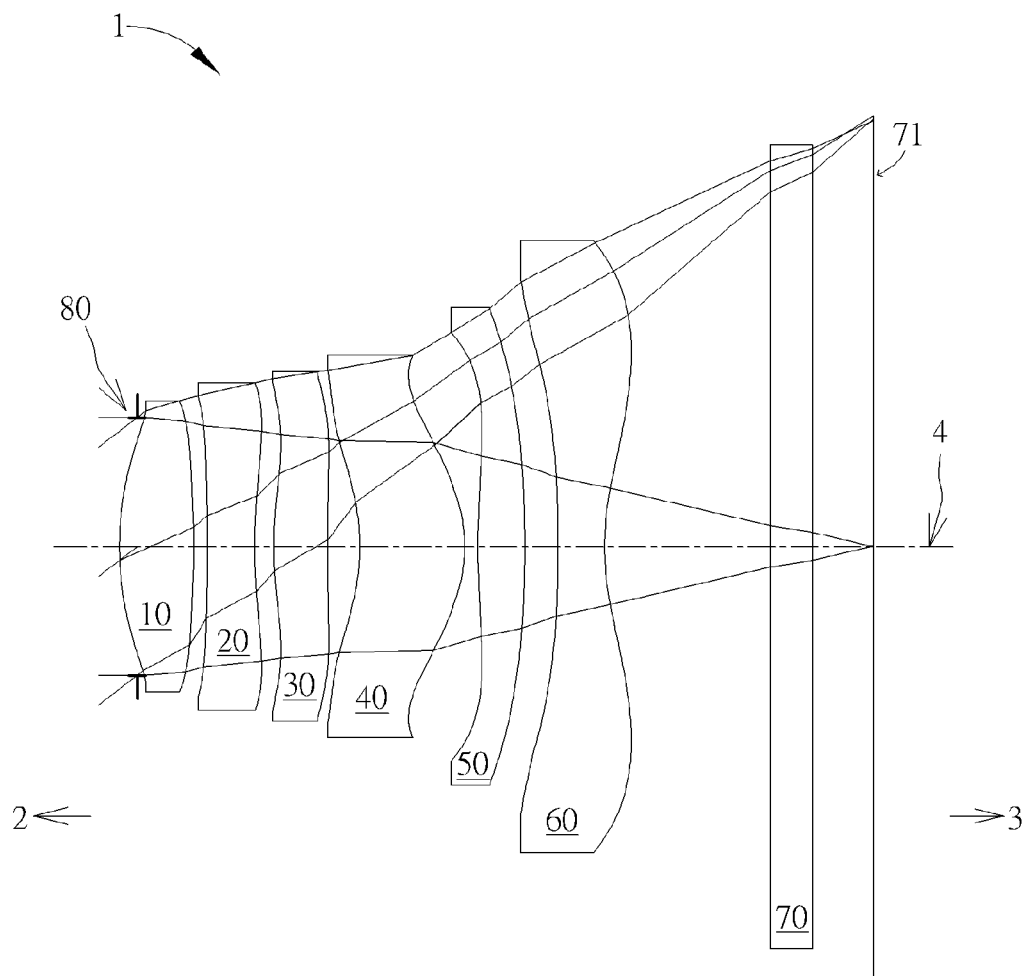
FIG. 10 illustrates a third example of the optical imaging lens set of six lens elements of the present invention.
Figures 11A, 11B:
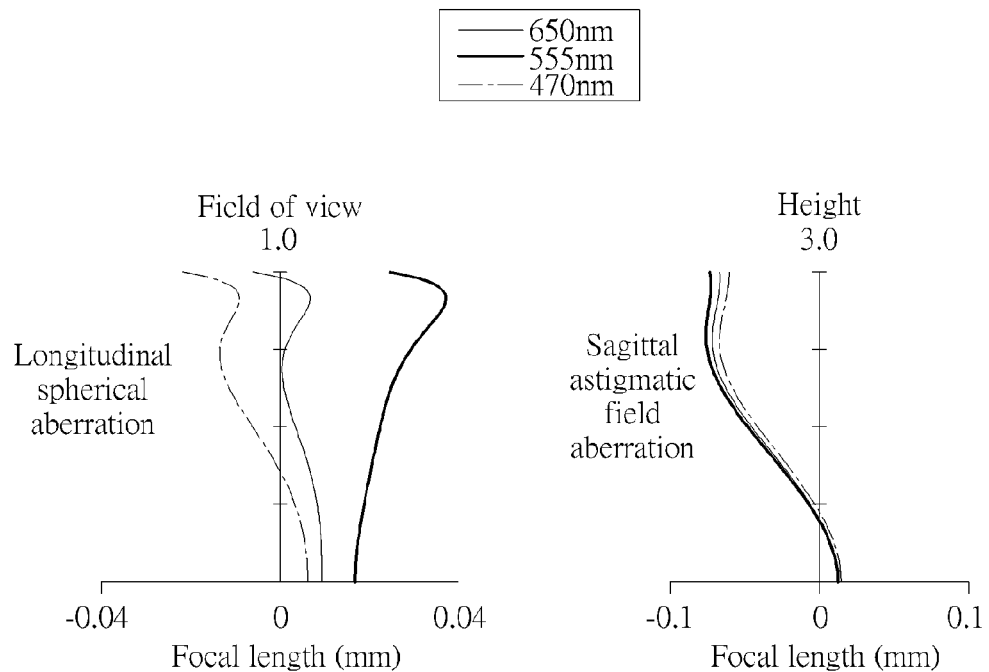
FIG. 11A illustrates the longitudinal spherical aberration on the image plane of the third example.
FIG. 11B illustrates the astigmatic aberration on the sagittal direction of the third example.
Figures 11C, 11D:
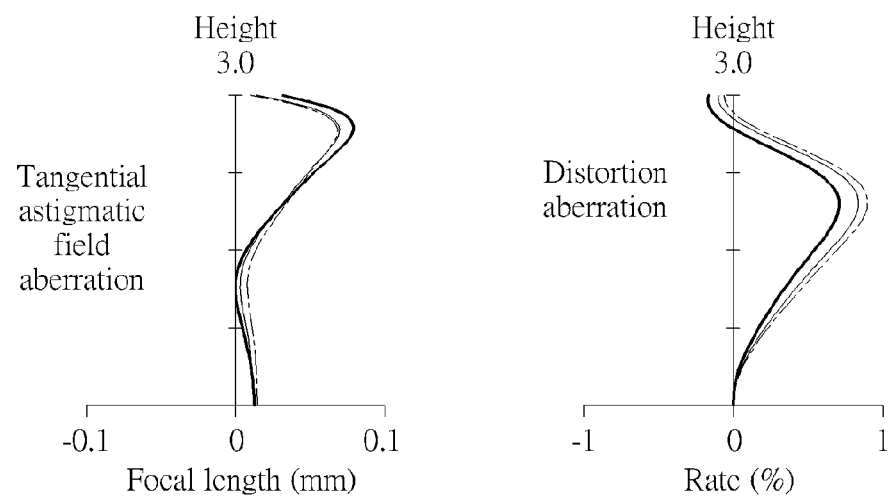
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example. The optical data of the third example of the optical imaging lens set are shown in FIG. 26 while the aspheric surface data are shown in FIG. 27. The image height is 3 mm. HFOV is 39.968 degrees. Some important ratios of the third example are as follows:
EFL/$T_1$=7.495
$T_6$/$G_{34}$=1.427
ALT/$G_{34}$=11.402
BFL/$T_2$=5.761
$T_2$/$T_6$=1.000
$T_5$/$T_1$=0.627
EFL/$T_2$=11.956
$T_1$/$T_3$=1.378
ALT/$T_1$=5.008
EFL/$G_{34}$=17.065
AAG/($G_{45}$+$G_{56}$)=2.410
$T_5$/$T_6$=1.000
EFL/$T_4$=5.349
$T_5$/$T_4$=0.447
ALT/$T_4$=3.574

Fourth Example

Figure 12:
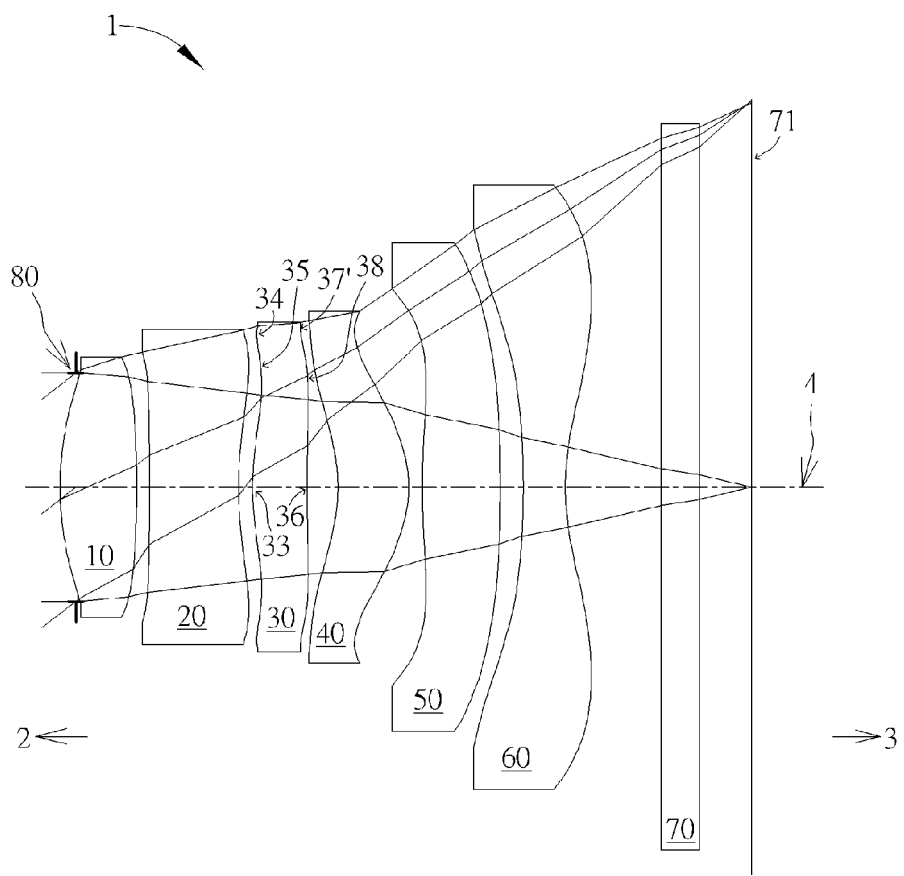
FIG. 12 illustrates a fourth example of the optical imaging lens set of six lens elements of the present invention.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33 in the vicinity of the optical axis, a convex part 34' in a vicinity of its circular periphery and a concave part 35 between the optical axis and the circular periphery part, and the third image-side surface 32 has a concave part 36 in the vicinity of the optical axis, a concave part 37' in a vicinity of its circular periphery and a convex part 38 between the optical axis and the circular periphery part. The optical data of the fourth example of the optical imaging lens set are shown in FIG. 28 while the aspheric surface data are shown in FIG. 29. The image height is 3 mm. HFOV is 40.150 degrees. Some important ratios of the fourth example are as follows:
EFL/$T_1$=6.416
$T_6$/$G_{34}$=1.339
ALT/$G_{34}$=13.178
BFL/$T_2$=2.096
$T_2$/$T_6$=2.131
$T_5$/$T_1$=1.011
EFL/$T_2$=5.559
$T_1$/$T_3$=1.411

ALT/$T_1$=5.331
EFL/$G_{34}$=15.860
AAG/($G_{45}$+$G_{56}$)=2.555
$T_5$/$T_6$=1.866
EFL/$T_4$=7.003
$T_5$/$T_4$=1.103
ALT/$T_4$=5.819

Fifth Example

Figure 14:
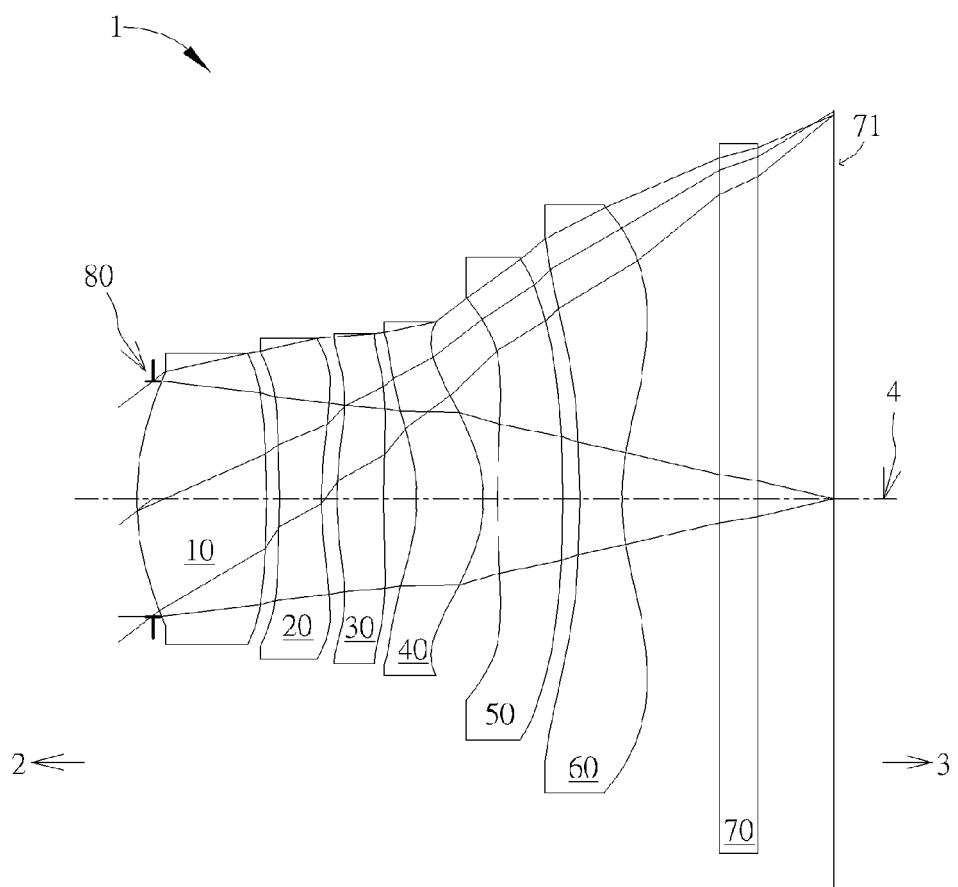
FIG. 14 illustrates a fifth example of the optical imaging lens set of six lens elements of the present invention.
Figures 15A, 15B:
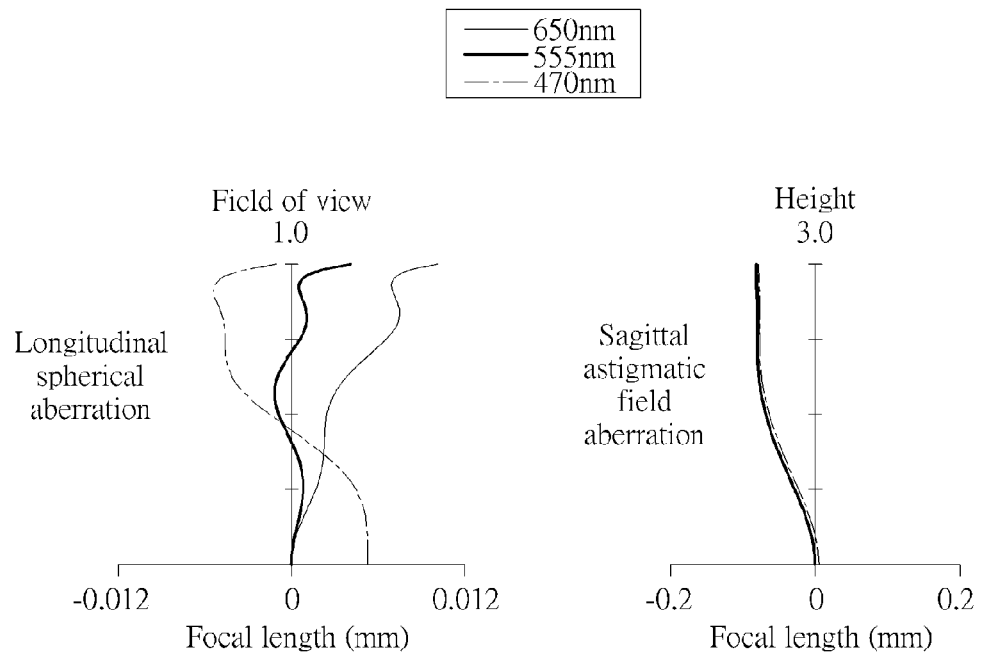
FIG. 15A illustrates the longitudinal spherical aberration on the image plane of the fifth example.
FIG. 15B illustrates the astigmatic aberration on the sagittal direction of the fifth example.
Figures 15C, 15D:
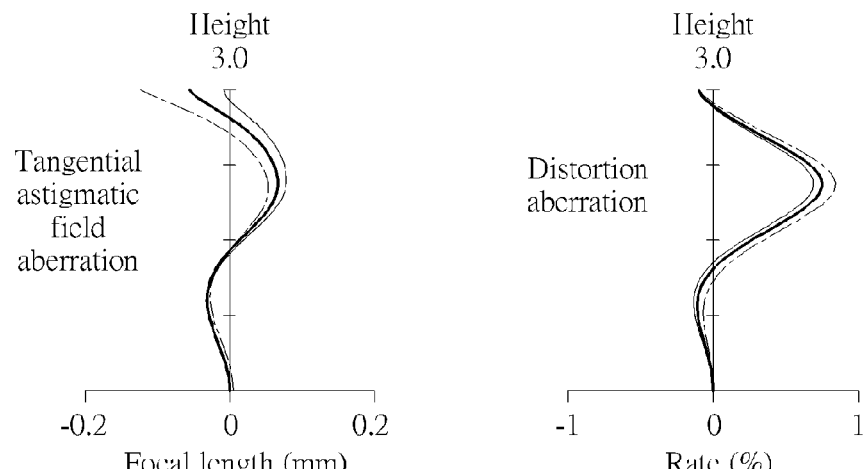
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 30 while the aspheric surface data are shown in FIG. 31. The image height is 3 mm. HFOV is 39.529 degrees. Some important ratios of the fifth example are as follows:
EFL/$T_1$=3.915
$T_6$/$G_{34}$=1.262
ALT/$G_{34}$=11.845
BFL/$T_2$=5.066
$T_2$/$T_6$=1.000
$T_5$/$T_1$=0.507
EFL/$T_2$=12.130
$T_1$/$T_3$=2.765
ALT/$T_1$=3.029
EFL/$G_{34}$=15.307
AAG/($G_{45}$+$G_{56}$)=3.059
$T_6$/$T_6$=1.570
EFL/$T_4$=7.594
$T_6$/$T_4$=0.983
ALT/$T_4$=5.876

Sixth Example

Figure 16:
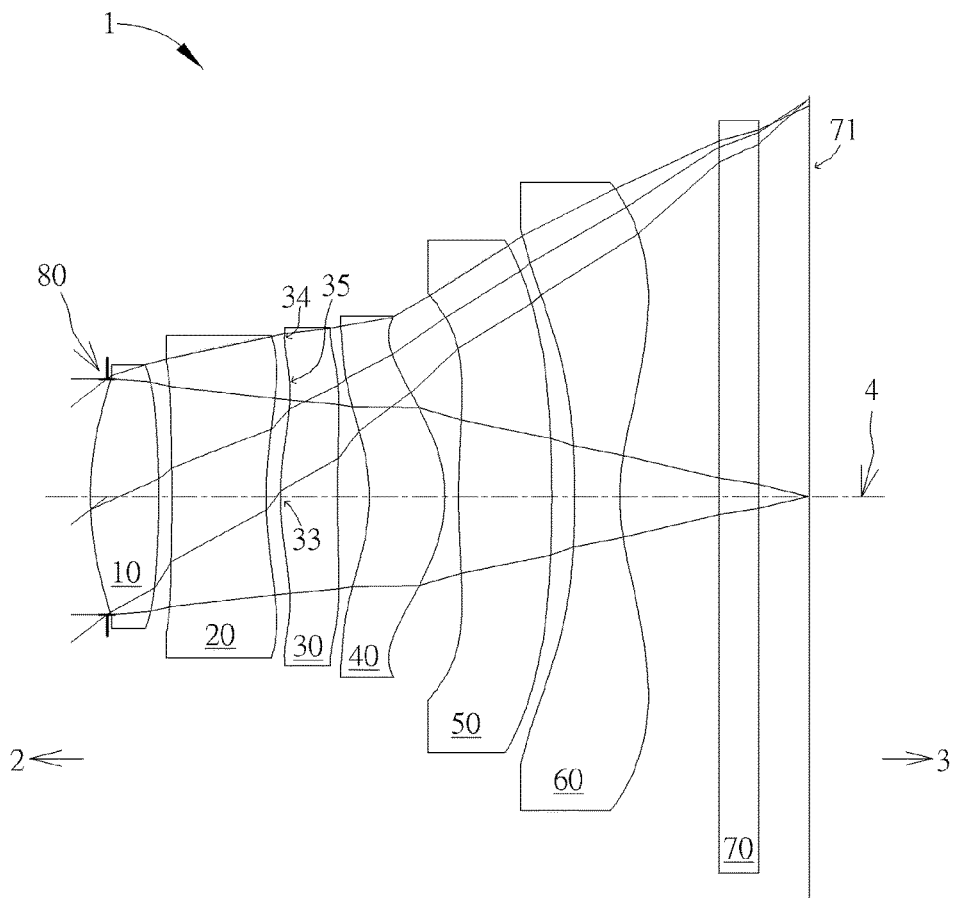
FIG. 16 illustrates a sixth example of the optical imaging lens set of six lens elements of the present invention.
Figures 17A, 17B:
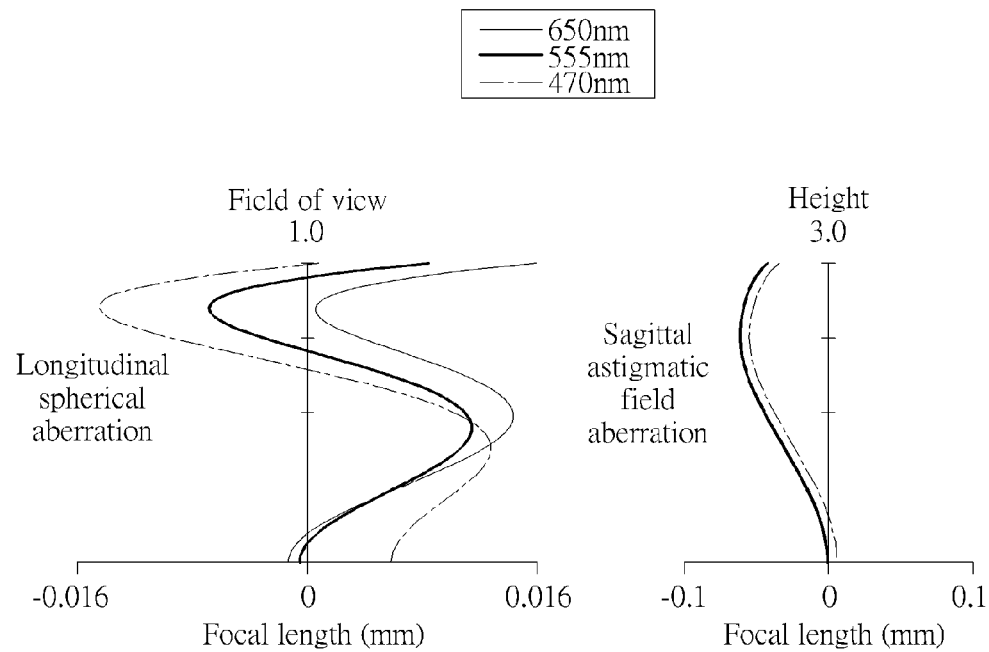
FIG. 17A illustrates the longitudinal spherical aberration on the image plane of the sixth example.
FIG. 17B illustrates the astigmatic aberration on the sagittal direction of the sixth example.
Figures 17C, 17D:
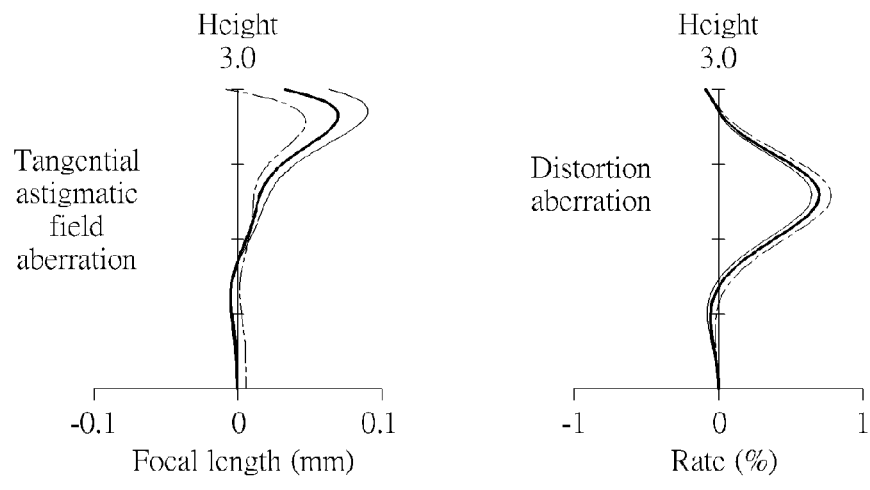
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33 in the vicinity of the optical axis, a convex part 34' in a vicinity of its circular periphery and a concave part 35 between the optical axis and the circular periphery part. The optical data of the sixth example of the optical imaging lens set are shown in FIG. 32 while the aspheric surface data are shown in FIG. 33. The image height is 3 mm. HFOV is 40.216 degrees. Some important ratios of the sixth example are as follows:

EFL/$T_1$=7.468
$T_6$/$G_{34}$=1.438
ALT/$G_{34}$=13.816
BFL/$T_2$=2.003
$T_2$/$T_6$=2.089
$T_5$/$T_1$=1.371
EFL/$T_2$=5.402
$T_1$/$T_3$=1.195
ALT/$T_1$=6.357
EFL/$G_{34}$=16.229
AAG/($G_{45}$+$G_{56}$)=2.622
$T_5$/$T_6$=2.071
EFL/$T_4$=6.757
$T_5$/$T_4$=1.240
ALT/$T_4$=5.752

Seventh Example

Figure 18:
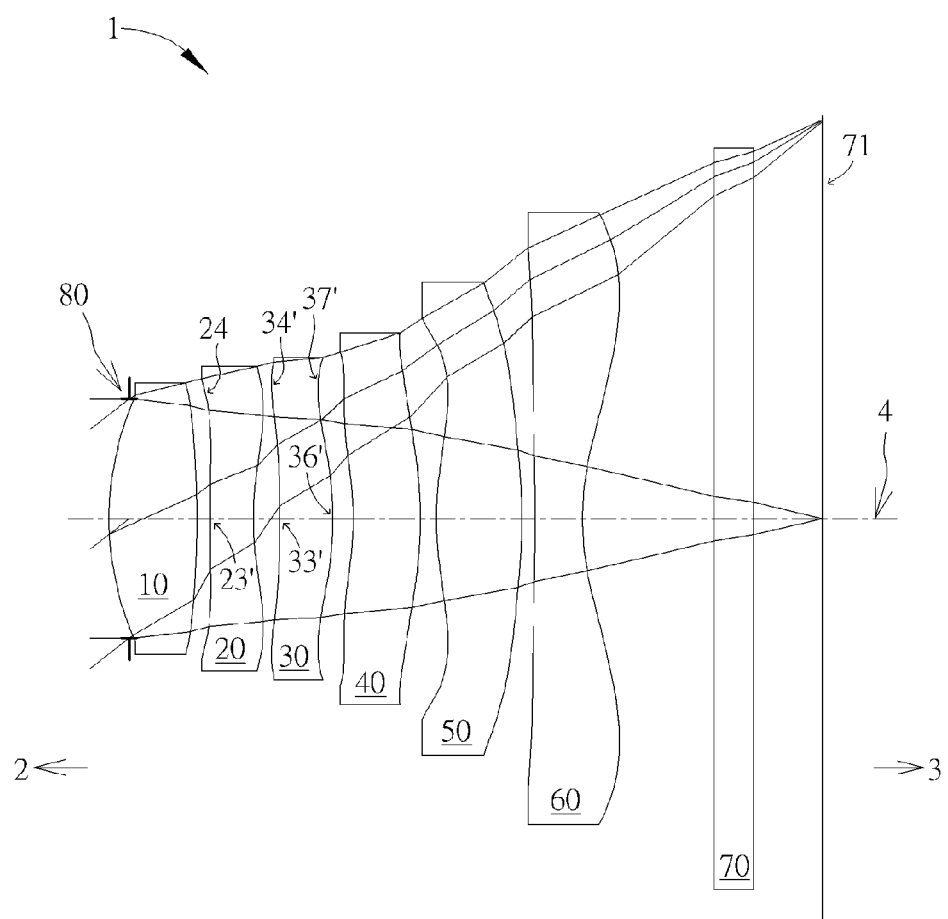
FIG. 18 illustrates a seventh example of the optical imaging lens set of six lens elements of the present invention.
Figures 19A, 19B:
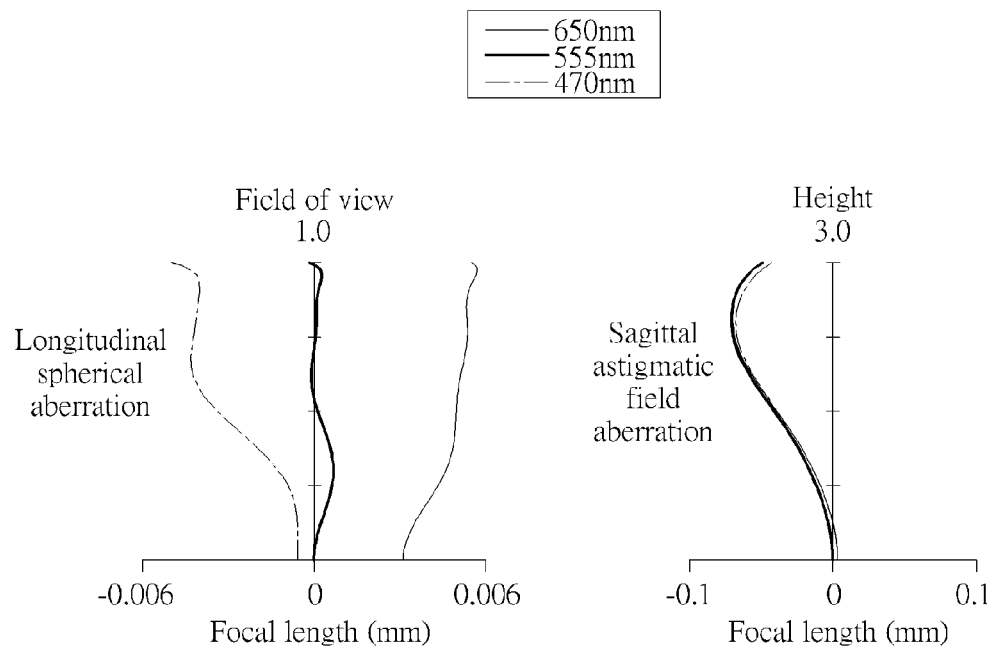
FIG. 19A illustrates the longitudinal spherical aberration on the image plane of the seventh example.
FIG. 19B illustrates the astigmatic aberration on the sagittal direction of the seventh example.
Figures 19C, 19D:
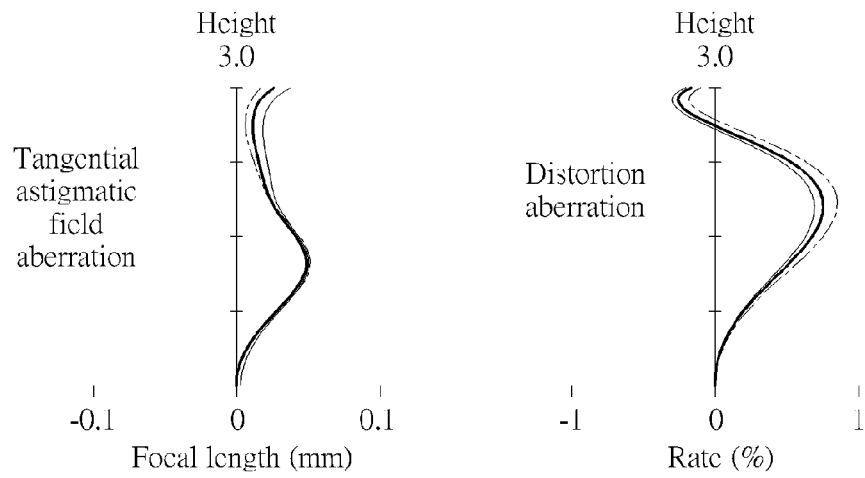
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the second object-side surface 21 of the second lens element 20 has a convex part 23' in the vicinity of the optical axis and a concave part 24 in a vicinity of its circular periphery, the third object-side surface 31 of the third lens element 30 has a concave part 33' in the vicinity of the optical axis and a convex part 34' in a vicinity of its circular periphery. The third image-side surface 32 has a convex part 36' in the vicinity of the optical axis and a concave part 37' in a vicinity of its circular periphery. The optical data of the seventh example of the optical imaging lens set are shown in FIG. 34 while the aspheric surface data are shown in FIG. 35. The image height is 3 mm. HFOV is 39.896 degrees. Some important ratios of the seventh example are as follows:
EFL/$T_1$=5.864
$T_6$/$G_{34}$=2.281
ALT/$G_{34}$=18.682
BFL/$T_2$=5.564
$T_2$/$T_6$=0.920
$T_5$/$T_1$=0.975
EFL/$T_2$=11.980
$T_1$/$T_3$=1.666
ALT/$T_1$=4.358
EFL/$G_{34}$=25.142
AAG/($G_{45}$+$G_{56}$)=3.041
$T_5$/$T_6$=1.833
EFL/$T_4$=7.708
$T_5$/$T_4$=1.282
ALT/$T_4$=5.728

Some important ratios in each example are shown in FIG. 36. The distance between the sixth image-side surface 62 of the sixth lens element 60 to the filter 70 along the optical axis 4 is G6F; the thickness of the filter 70 along the optical axis 4 is TF; the distance between the filter 70 to the image plane 71 along the optical axis 4 is GFI; the distance between the sixth image-side surface 62 of the sixth lens element 60 to the image plane 71 along the optical axis 4 is BFL. Therefore, BFL=G6F+TF+GFI.

In the light of the above examples, the inventors observe the following features:

1. The first image-side surface with a convex part in a vicinity of its circular periphery, the second image-side surface with a concave part in the vicinity of the optical axis and with a convex part in a vicinity of its circular periphery, the fourth image-side surface with a concave part in a vicinity of its circular periphery and the sixth object-side surface with a concave part in the vicinity of the optical axis together help correct the aberration and improve the imaging quality.

2. The third lens element 30, the fifth lens element 50 and the sixth lens element 60 which are made of a plastic material are advantageous to the reduction of the weight of the lens elements and the cost for production.

3. The aperture stop is disposed in front of the first lens element to improve the imaging quality and to decrease the length of the optical imaging lens set.

4. With the further help of a convex part in a vicinity of the optical axis and its circular periphery of the first object-side surface, of a convex part in a vicinity of the optical axis of the first image-side surface, a concave part in a vicinity of its circular periphery of the second object-side surface, a concave part in a vicinity of the optical axis of the fourth object-side surface, a convex part in a vicinity of its circular periphery of the fourth image-side surface, a concave part in a vicinity of its circular periphery and a convex part in a vicinity of the optical axis of the fifth object-side surface, a convex part in a vicinity of its circular periphery and in a vicinity of the optical axis of the fifth image-side surface, a concave part in a vicinity of its circular periphery of the sixth object-side surface, and a convex part in a vicinity of its circular periphery and a concave part in a vicinity of the optical axis of the sixth image-side surface, it ensures a good imaging quality while decreasing the total length of the optical imaging lens set. Furthermore, if all of the lens elements are made of a plastic material, this can further help to decrease the manufacturing cost and the weight to form the aspherical surface.

In addition, the inventors discover that there are some better ratio ranges for different data according to the above various important ratios. Better ratio ranges help the designers to design a better optical performance and an effectively reduce length of a practically possible optical imaging lens set. For example:

(1) Since the lens element becomes lighter and thinner, and the imaging quality demands get higher and higher, so that the lens is designed to have different shape surface in a vicinity of the optical axis and in vicinity of its circular periphery, the thickness is different in the central part of the lens element or near the edge of the lens element. Considering the characteristics of light, the light which is emitted from the near-edge side of the lens element has the longer path and larger refraction angle to focus onto the image plane. EFL is related to the thickness of each lens element and the air gaps, and BFL is also dependent on EFL so the following relationships are proposed to effectively reduce the total length while keeping a good imaging quality.

Figure 20:
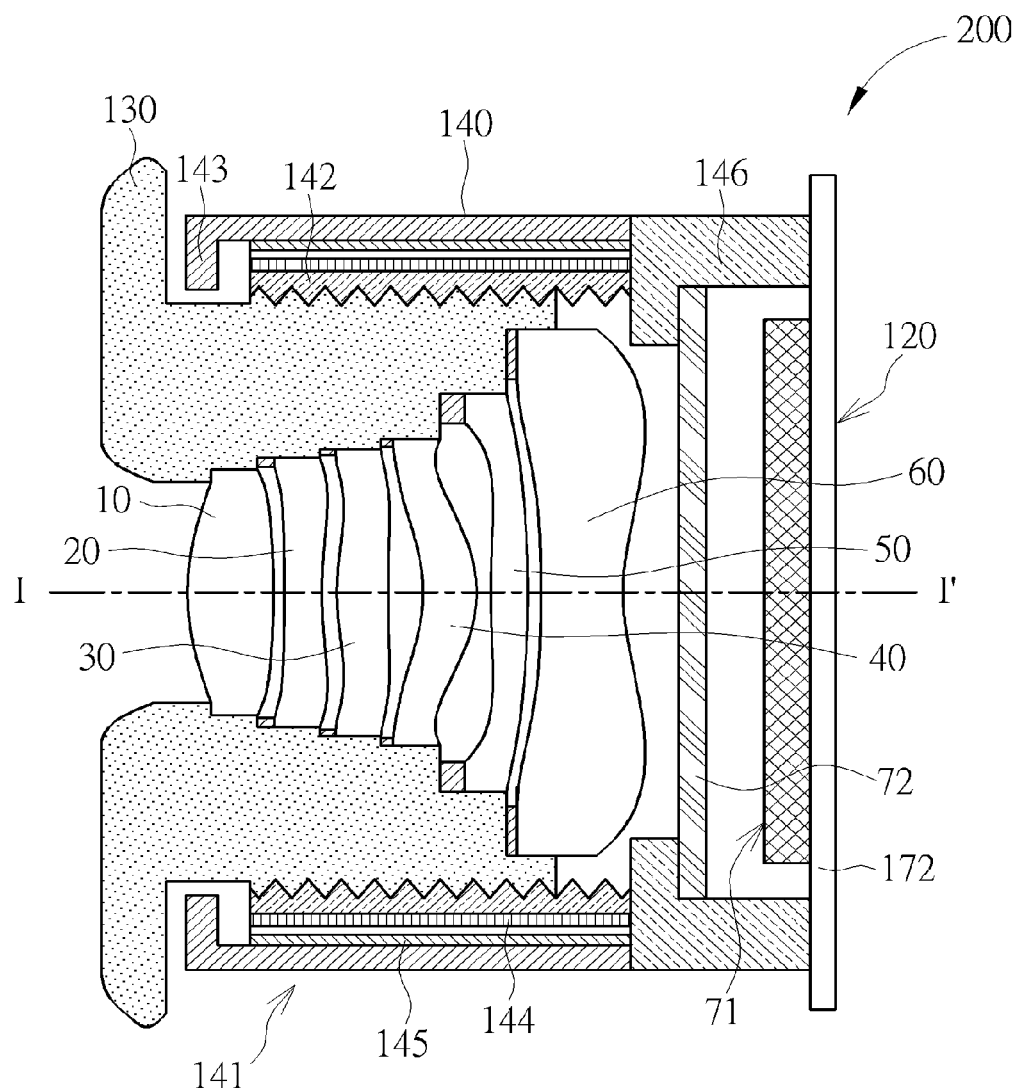
FIG. 20 illustrates a first preferred example of the portable electronic device with an optical imaging lens set of the present invention.

$EFL/T_1 \leq 7.5$
$BFL/T_2 \leq 5.77$
$0.45 \leq T_2/T_6$
$T_5/T_1 \leq 1.4$
$EFL/T_2 \leq 16$
$1 \leq T_1/T_3$
$ALT/T_1 \leq 7$
$2.41 \leq AAG/(G_{45}+G_{56})$
$T_5/T_6 \leq 2.08$
$EFL/T_4 \leq 9.38$
$T_5/T_4 \leq 1.29$
$ALT/T_4 \leq 6.5$ (2) The shape of the third image-side surface and the fourth object-side surface are not specifically specified so they can be much more reduced in length to facilitate the total reduction of the optical lens set. However, it is still needed to keep $G_{34}$ to have a certain width to facilitate the assembly of the optical lens set. The following relationship are suggested to have a better manufacturing yield:

$T_6/G_{34} \leq 4$
$ALT/G_{34} \leq 19$
$EFL/G_{34} \leq 25.1$ (3) To obtain a better imaging quality and to facilitate the fabrication of the optical lens set, and the arrangement of the thickness and gaps, the following relationships are suggested:

$3.5 \leq EFL/T_1 \leq 7.5$
$0.8 \leq T_6/G_{34} \leq 4$
$9 \leq ALT/G_{34} \leq 19$
$1.8 \leq BFL/T_2 \leq 5.77$
$0.45 \leq T_2/T_6 \leq 2.25$
$0.3 \leq T_5/T_1 \leq 1.4$
$5 \leq EFL/T_2 \leq 16$
$1 \leq T_1/T_3 \leq 3.2$
$2.5 \leq ALT/T_1 \leq 7$
$10 \leq EFL/G_{34} \leq 25.2$
$2.41 \leq AAG/(G_{45}+G_{56}) \leq 4$
$0.3 \leq T_5/T_6 \leq 2.08$
$4.8 \leq EFL/T_4 \leq 9.38$
$0.3 \leq T_5/T_4 \leq 1.29$
$3 \leq ALT/T_4 \leq 6.5$ The optical imaging lens set 1 of the present invention may be applied to an electronic device, such as mobile phones or driving recorders. Please refer to FIG. 20. FIG. 20 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 20 as an example, but the electronic device 100 is not limited to a driving recorder.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 70 may be omitted in other examples although the optional filter 70 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 21:
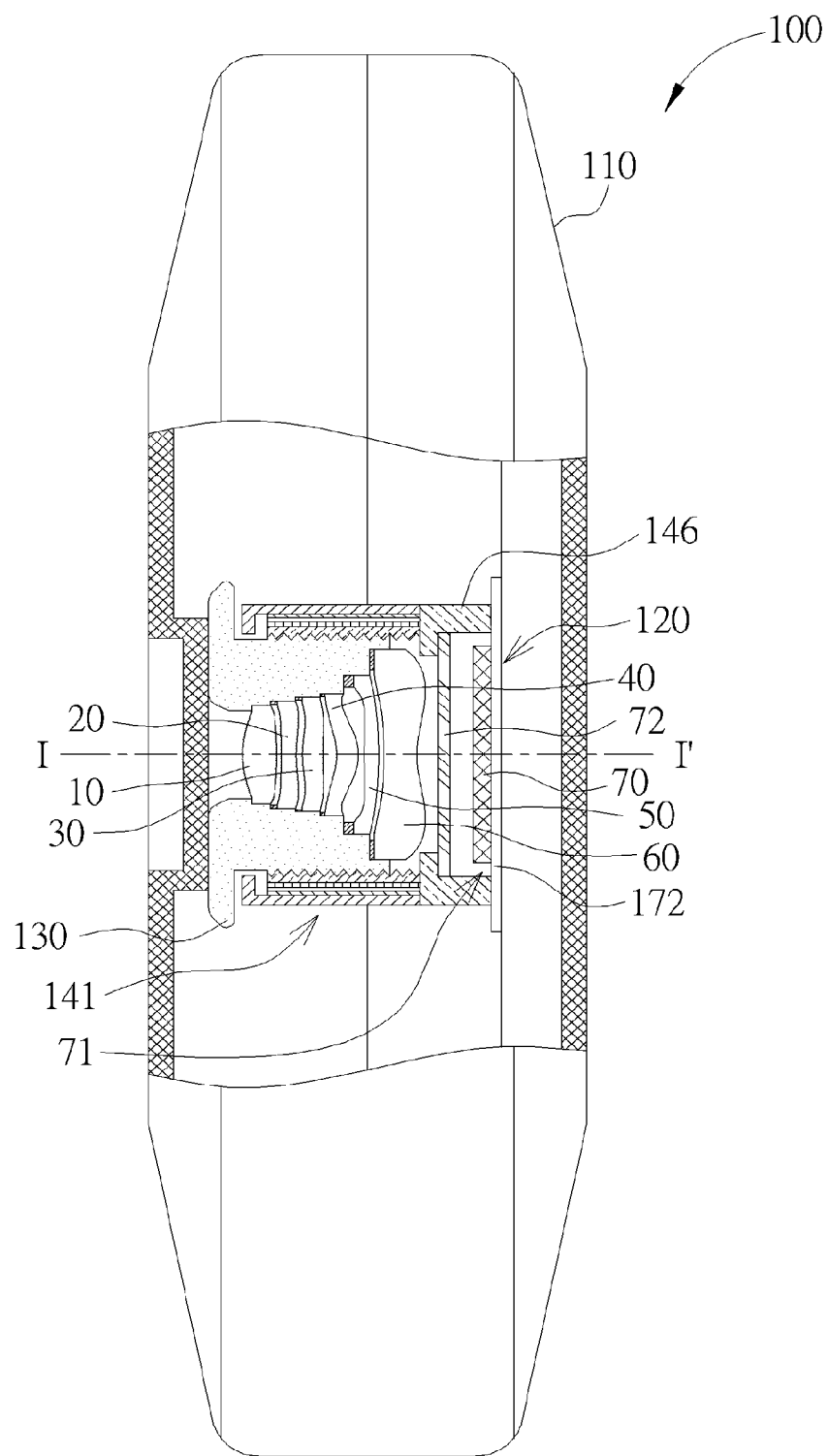
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 70, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first lens element to said sixth lens element each having an object-side surface facing toward the object side as well as an image-side surface facing toward the image side, wherein:
    said first lens element has an image-side surface with a convex portion in a vicinity of its periphery;
    said second lens element has an image-side surface with a concave portion in a vicinity of said optical axis and a convex portion in a vicinity of its periphery;
    said third lens element is made of plastic;
    said fourth lens element has an image-side surface with a concave portion in a vicinity of its periphery;
    said fifth lens element is made of plastic; and
    said sixth lens element is made of plastic and has an object-side surface with a concave portion in a vicinity of said optical axis, and said optical imaging lens set exclusively has said first lens element, said second lens element, said third lens element, said fourth lens element, said fifth lens element and said sixth lens element with refractive power, wherein an effective focal length EFL of said optical imaging lens set and a thickness T1 of said first lens element along said optical axis satisfy a relationship $EFL/T1 \leq 7.5$.

2. The optical imaging lens set of claim 1, wherein an air gap $G_{34}$ between said third lens element and said fourth lens element along said optical axis and a thickness $T_6$ of said sixth lens element along said optical axis satisfy a relationship $T_6/G_{34} \leq 4$.

3. The optical imaging lens set of claim 1, wherein a total thickness ALT of said first lens element, said second lens element, said third lens element, said fourth lens element, said fifth lens element and said sixth lens element along said optical axis, and an air gap $G_{34}$ between said third lens element and said fourth lens element along said optical axis satisfy a relationship $ALT/G_{34} \leq 19$.

4. The optical imaging lens set of claim 1, wherein a distance BFL between said image-side surface of said sixth lens element to an image plane and a thickness $T_2$ of said second lens element along said optical axis satisfy a relationship $BFL/T_2 \leq 5.77$.

5. The optical imaging lens set of claim 1, wherein a thickness $T_2$ of said second lens element along said optical axis and a thickness $T_6$ of said sixth lens element along said optical axis satisfy a relationship $0.45 \leq T_2/T_6$.

6. The optical imaging lens set of claim 5, wherein a thickness $T_5$ of said fifth lens element along said optical axis satisfies a relationship $T_5/T_1 \leq 1.4$.

7. The optical imaging lens set of claim 1, wherein a thickness $T_2$ of said second lens element along said optical axis satisfies a relationship $EFL/T_2 \leq 16$.

8. The optical imaging lens set of claim 7, wherein a thickness $T_3$ of said third lens element along said optical axis satisfies a relationship $1 \leq T_1/T_3$.

9. The optical imaging lens set of claim 1, wherein a total thickness ALT of said first lens element, said second lens element, said third lens element, said fourth lens element, said fifth lens element and said sixth lens element along said optical axis satisfies a relationship $ALT/T_1 \leq 7$.

10. The optical imaging lens set of claim 9, wherein an air gap $G_{34}$ between said third lens element and said fourth lens element along said optical axis satisfies a relationship $EFL/G_{34} \leq 25.2$.

11. The optical imaging lens set of claim 9, wherein the sum of all five air gaps AAG between each lens element from said first lens element to said sixth lens element along the optical axis, an air gap $G_{45}$ between said fourth lens element and said fifth lens element along said optical axis and an air gap $G_{56}$ between said fifth lens element and said sixth lens element along said optical axis satisfy a relationship $2.41 \leq AAG/(G_{45}+G_{56})$.

12. The optical imaging lens set of claim 1, wherein a thickness $T_5$ of said fifth lens element along said optical axis and a thickness $T_6$ of said sixth lens element along said optical axis satisfy a relationship $T_5/T_6 \leq 2.08$.

13. The optical imaging lens set of claim 12, wherein a thickness $T_4$ of said fourth lens element along said optical axis satisfies a relationship $EFL/T_4 \leq 9.38$.

14. The optical imaging lens set of claim 1, wherein a thickness $T_4$ of said fourth lens element along said optical axis and a thickness $T_5$ of said fifth lens element along said optical axis satisfy a relationship $T_5/T_4 \leq 1.29$.

15. The optical imaging lens set of claim 1, wherein a total thickness ALT of said first lens element, said second lens element, said third lens element, said fourth lens element, said fifth lens element and said sixth lens element along said optical axis, and a thickness $T_4$ of said fourth lens element along said optical axis satisfy a relationship $ALT/T_4 \leq 6.5$.

16. An electronic device, comprising:
a case; and
an image module disposed in said case and comprising:
 an optical imaging lens set of claim 1;
 a barrel for the installation of said optical imaging lens set;
 a module housing unit for the installation of said barrel; and
 an image sensor disposed at an image side of said optical imaging lens set.

* * * * *